(12) United States Patent
Kenney et al.

(10) Patent No.: US 11,326,265 B2
(45) Date of Patent: May 10, 2022

(54) HIGHLY SUSTAINED ELECTRODES AND ELECTROLYTES FOR SALTY ALKALINE AND NEUTRAL WATER SPLITTING

(71) Applicant: The Board of Trustees of the Leland Stanford Junior University, Stanford, CA (US)

(72) Inventors: Michael J. Kenney, Stanford, CA (US); Hongjie Dai, Stanford, CA (US); Yun Kuang, Stanford, CA (US); Yongtao Meng, Stanford, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 0 days.

(21) Appl. No.: 16/968,813

(22) PCT Filed: Feb. 1, 2019

(86) PCT No.: PCT/US2019/016426
§ 371 (c)(1),
(2) Date: Aug. 10, 2020

(87) PCT Pub. No.: WO2019/160701
PCT Pub. Date: Aug. 22, 2019

(65) Prior Publication Data
US 2021/0002777 A1   Jan. 7, 2021

Related U.S. Application Data

(60) Provisional application No. 62/630,599, filed on Feb. 14, 2018.

(51) Int. Cl.
| | |
|---|---|
| *C25B 11/051* | (2021.01) |
| *C25B 11/057* | (2021.01) |
| *C25B 11/075* | (2021.01) |
| *C25B 11/091* | (2021.01) |
| *C25B 1/04* | (2021.01) |

(Continued)

(52) U.S. Cl.
CPC ........... *C25B 11/051* (2021.01); *C25B 1/04* (2013.01); *C25B 11/03* (2013.01); *C25B 11/052* (2021.01);
(Continued)

(58) Field of Classification Search
CPC ...................................................... C25D 5/48
See application file for complete search history.

(56) References Cited

U.S. PATENT DOCUMENTS

2010/0133110 A1*  6/2010  Nocera ............... H01M 14/005
                                                    205/340

FOREIGN PATENT DOCUMENTS

| CN | 103397339 A | 11/2013 |
|---|---|---|
| WO | WO-2010/042197 A1 | 4/2010 |

OTHER PUBLICATIONS

Hunter et al "Effect of interlayer anions on [NiFe]-LDH nanosheet water oxidation activity" Energy & Environmental Science, 2016, 6, 1734. (Year: 2016).*
Zhou et al "Effects of redox-active interlayer anions on the oxygen evolution reactivity of NiFe-layered double hydroxide nanosheets" Nano Research, 2018, 11(3), p. 1358-1368. (Year: 2018).*
(Continued)

*Primary Examiner* — Brian W Cohen
(74) *Attorney, Agent, or Firm* — Foley & Lardner LLP

(57) ABSTRACT

A corrosion resistant anode is provided for oxygen evolution reaction in water including chloride ions. The anode includes: (1) a substrate; (2) a passivation layer coating the substrate; and (3) an electrocatalyst layer coating the passivation layer. Polyanion adjusted alkaline seawater electrolyte for hydrogen generation by electrolysis is also provided.

13 Claims, 21 Drawing Sheets

(51) Int. Cl.
    *C25B 11/03*       (2021.01)
    *C25D 11/34*       (2006.01)
    *C25D 11/36*       (2006.01)
    *C25B 11/052*     (2021.01)
    *C25B 15/08*       (2006.01)

(52) U.S. Cl.
    CPC .......... *C25B 11/057* (2021.01); *C25B 11/075* (2021.01); *C25B 11/091* (2021.01); *C25D 11/34* (2013.01); *C25D 11/36* (2013.01); *C25B 15/08* (2013.01)

(56) References Cited

OTHER PUBLICATIONS

International Preliminary Report on Patentability on PCT/US2019/016426 dated Aug. 27, 2020 (2 pages).
Dionigi, Fabio et al., "Design criteria, operating conditions, and nickel-iron hydroxide catalyst materials for selective seawater electrolysis", ChemSusChem, 2016, vol. 9, No. 9, pp. 962-972.
Ganesan, Pandian et al., "Inexpensive electrochemical synthesis of nickel iron sulphides on nickel foam: super active and ultra-durable electrocatalysts for alkaline electrolyte membrane water electrolysis", Journal of materials chemistry, A, 2016, vol. 4, No. 42, pp. 16394-16402.
International Search Report and Written Opinion for PCT Application No. PCT/US2019/016426 dated May 16, 2019, 18 pages.
Zhu, Wenxin et al., "Design and application of foams for electrocatalysis", ChemCatChem, 2017, vol. 9, No. 10, pp. 1721-1743.

\* cited by examiner

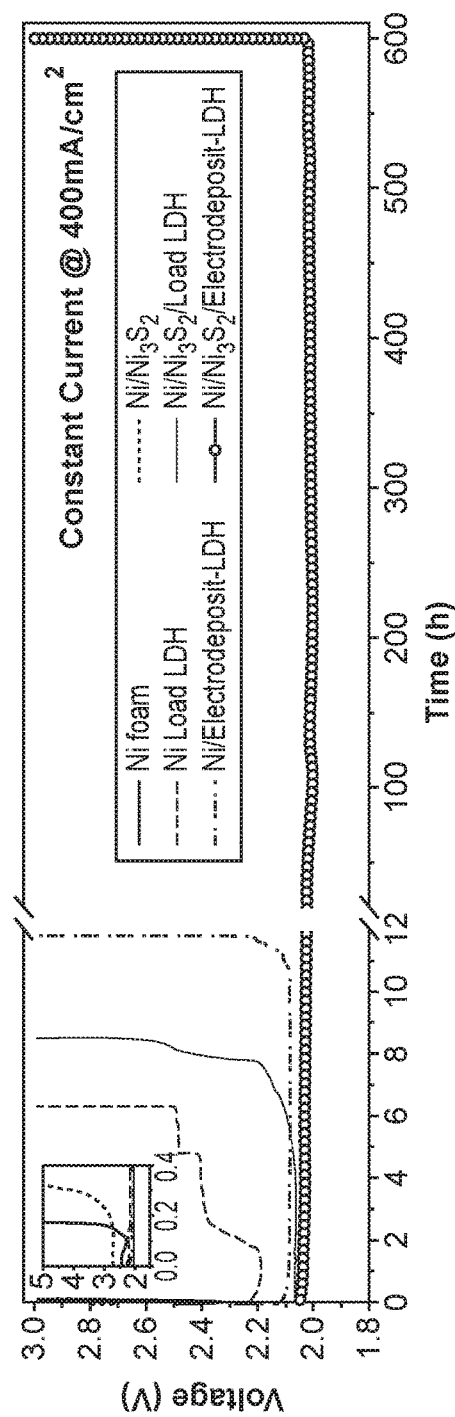
FIG. 3A
FIG. 3B
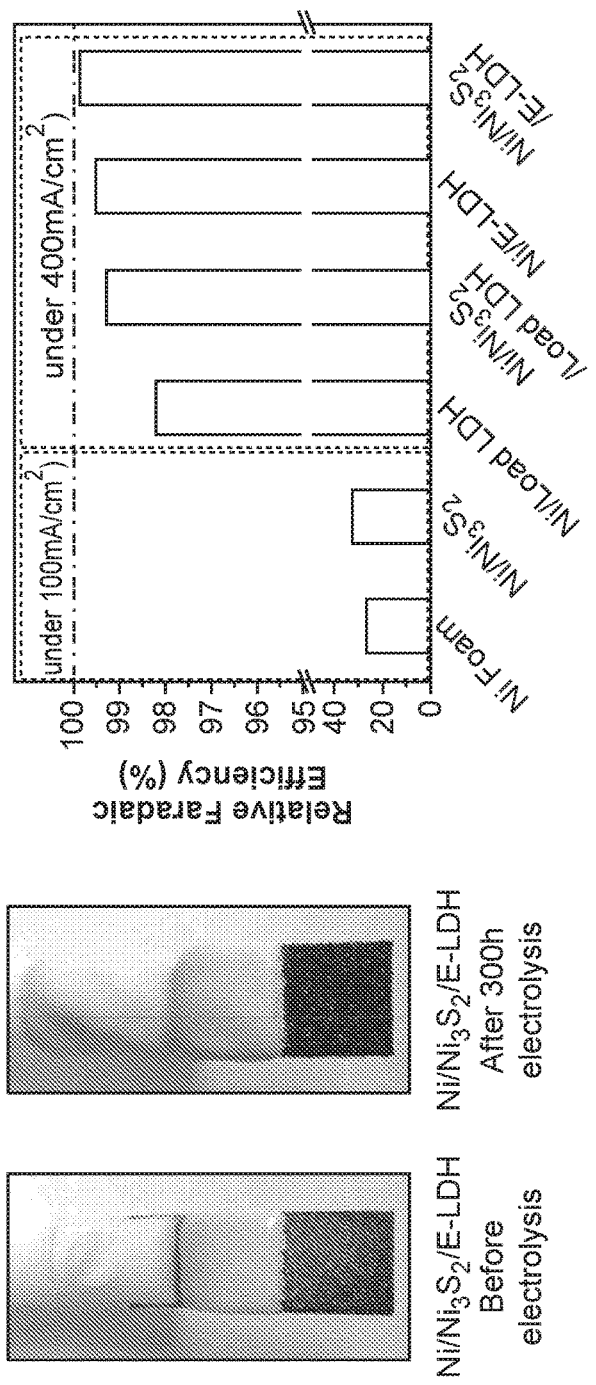
FIG. 3C

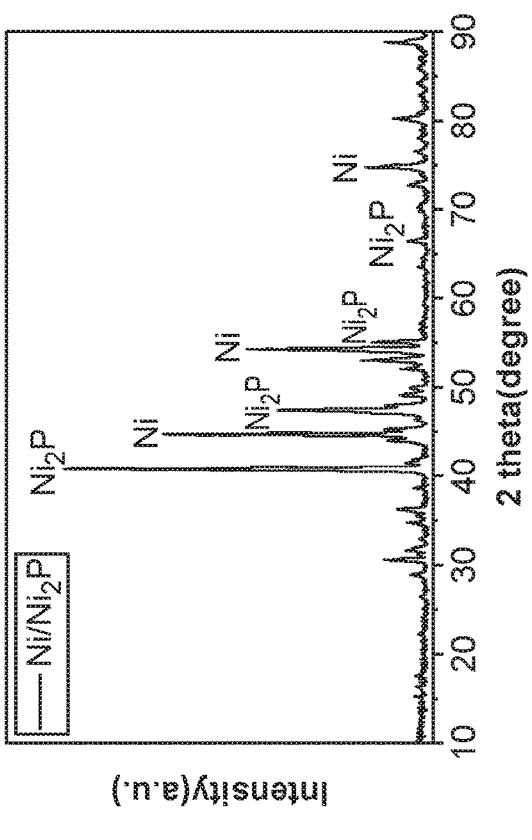
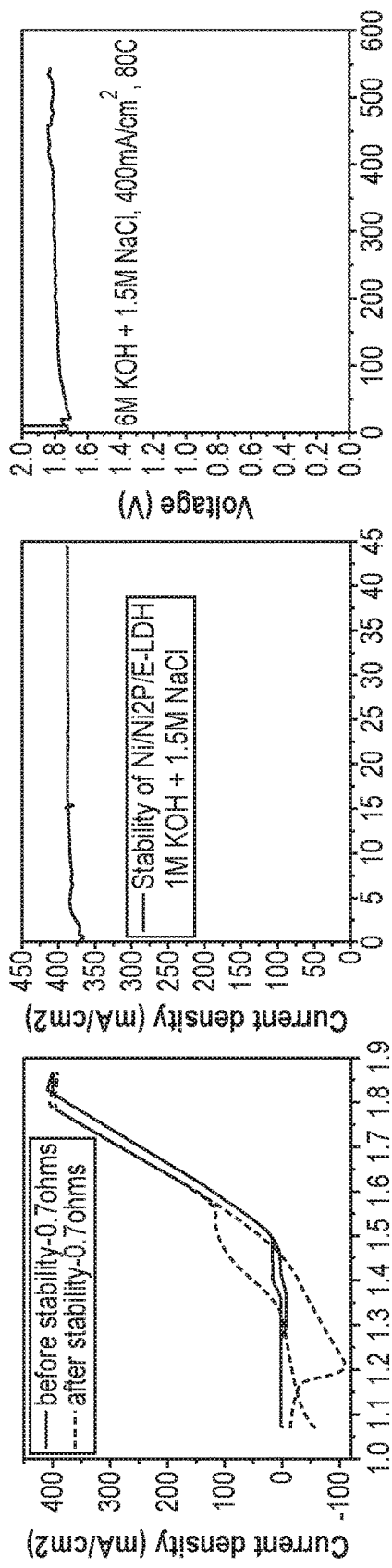
FIG. 5A
FIG. 5B
FIG. 5C
FIG. 5D
FIG. 5E

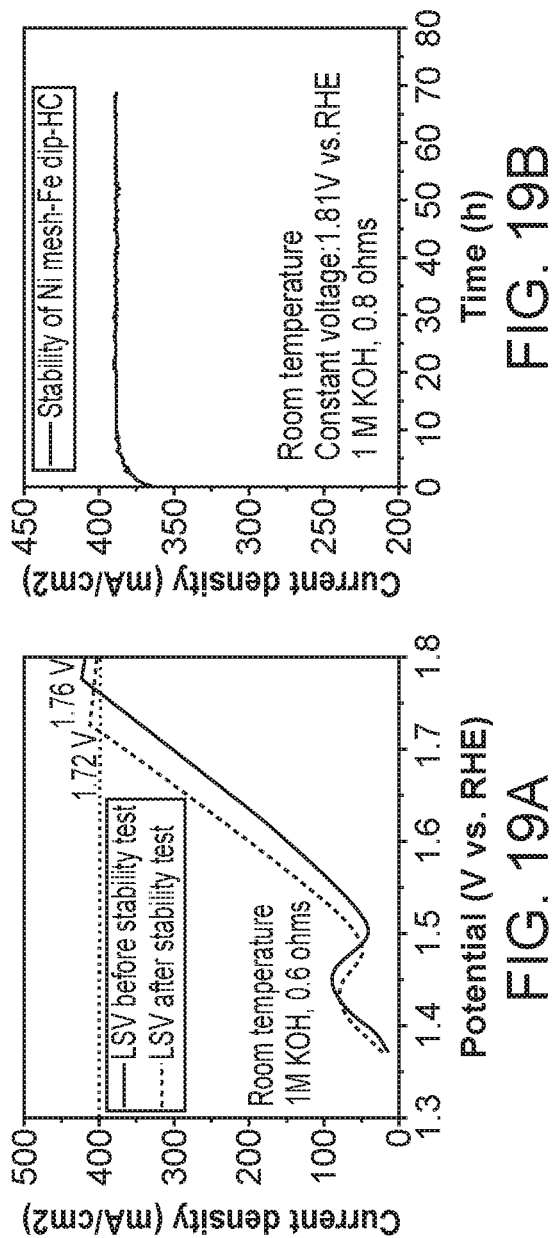
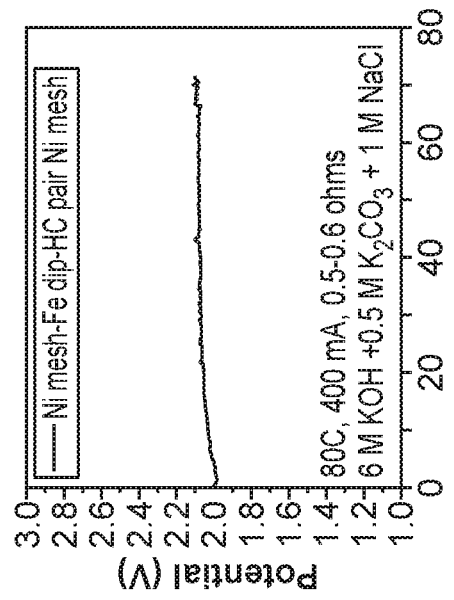
FIG. 19A
FIG. 19B
FIG. 19C

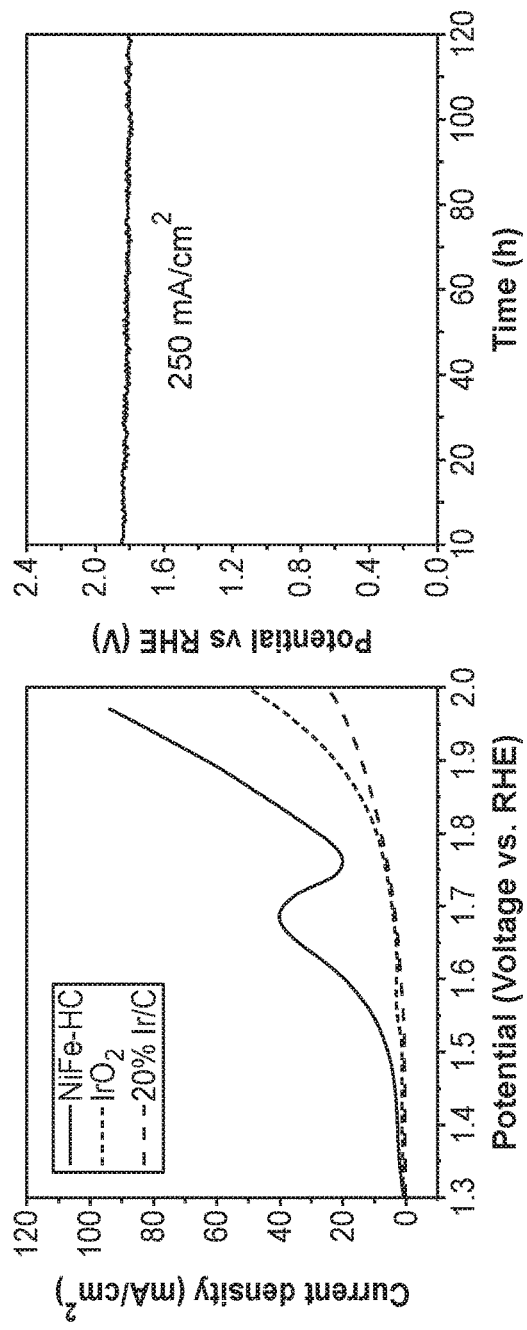
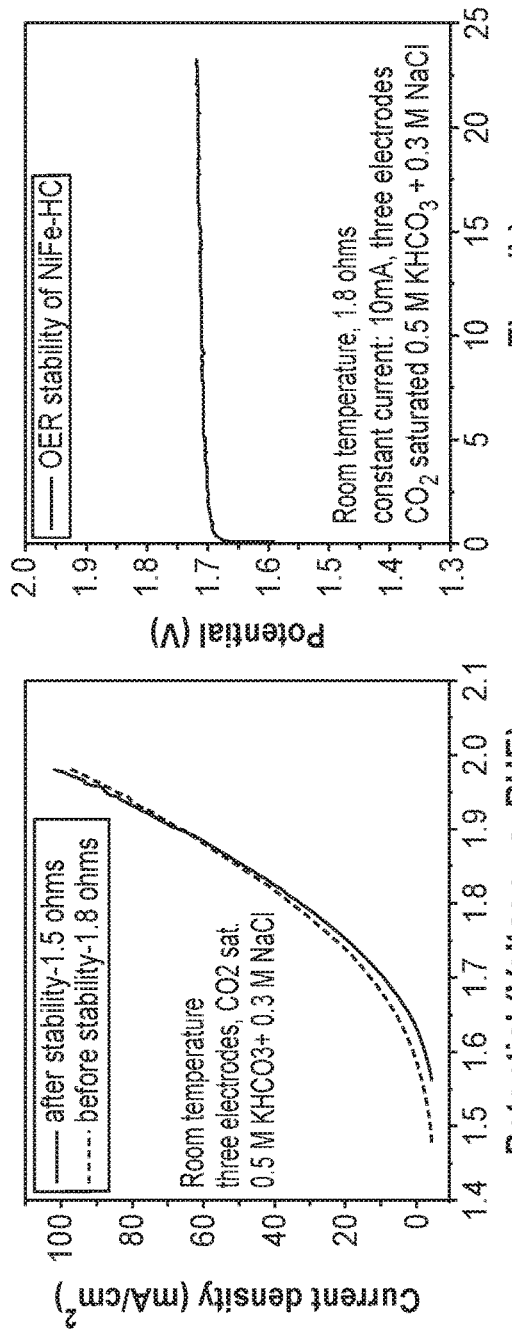
FIG. 20A
FIG. 20B
FIG. 20C
FIG. 20D

HIGHLY SUSTAINED ELECTRODES AND ELECTROLYTES FOR SALTY ALKALINE AND NEUTRAL WATER SPLITTING

CROSS-REFERENCE TO RELATED APPLICATION

This application is a National Stage Entry of PCT/US2019/016426, filed Feb. 1, 2019, which claims the benefit of and priority to U.S. Provisional Application No. 62/630,599, filed Feb. 14, 2018, the contents of which are incorporated herein by reference in their entirety.

STATEMENT REGARDING FEDERALLY SPONSORED RESEARCH OR DEVELOPMENT

This invention was made with Government support under contract DE-SC0016165 awarded by the Department of Energy. The Government has certain rights in the invention.

BACKGROUND

Electrolysis of water to generate hydrogen fuel is an attractive renewable energy storage solution. However, grid-scale fresh water electrolysis would place a heavy strain on vital water resources. Developing inexpensive electrocatalysts, electrodes, and electrolytes that can sustain seawater splitting without chloride corrosion can address the water scarcity issue.

It is against this background that a need arose to develop embodiments of this disclosure.

SUMMARY

In some embodiments, an anode is provided for oxygen evolution reaction in water including chloride, including: (1) a substrate; (2) a passivation layer coating the substrate; and (3) an electrocatalyst layer coating the passivation layer, wherein the passivation layer includes a sulfide of at least one metal.

In some embodiments, an anode is provided for oxygen evolution reaction in water including chloride, including: (1) a substrate; (2) a passivation layer coating the substrate; and (3) an electrocatalyst layer coating the passivation layer, wherein the passivation layer includes a phosphide of at least one metal.

In some embodiments, an anode is provided for oxygen evolution reaction in water including chloride, including: (1) a substrate; (2) an electrocatalyst layer coating the substrate; and (3) an anionic layer disposed between the substrate and the electrocatalyst layer.

In some embodiments, an anode is provided for oxygen evolution reaction in water including chloride, including: (1) a substrate; and (2) an electrocatalyst layer coating the substrate, wherein the electrocatalyst layer includes anions.

In some embodiments, a water electrolyzer is provided and includes the anode of any of the foregoing embodiments. In some embodiments, a method of operating the water electrolyzer includes generating oxygen and hydrogen from water including sodium chloride.

In some embodiments, a method of operating a water electrolyzer includes generating oxygen and hydrogen from an electrolyte, wherein the electrolyte includes alkaline seawater and polyatomic anions dispersed in the alkaline seawater with precipitated alkaline earth and heavy metal ions removed by filtration, and a concentration of the polyatomic anions in the electrolyte is in a range of about 0.05 M to about 8 M.

In some embodiments, a method of manufacturing an anode for oxygen evolution reaction includes: (1) providing a substrate; (2) forming a passivation layer coating the substrate; and (3) forming an electrocatalyst layer coating the passivation layer, thereby forming the anode including the substrate, the passivation layer, and the electrocatalyst layer.

In some embodiments, a method of manufacturing an anode for oxygen evolution reaction includes: (1) providing a substrate includes a transition metal as a dopant; (2) forming an electrocatalyst layer coating the substrate; and (3) applying a current to the substrate to form an anionic layer disposed between the substrate and the electrocatalyst layer, wherein the anionic layer includes an anionic oxide of the transition metal.

In some embodiments, a method of manufacturing an anode for oxygen evolution reaction includes: (1) providing a substrate; and (2) forming an electrocatalyst layer coating the substrate, thereby forming the anode including the substrate and the electrocatalyst layer, wherein forming the electrocatalyst layer is in the presence of an electrolyte solution including anions, and the anions are incorporated within the electrocatalyst layer.

In some embodiments, a method of manufacturing an anode for oxygen evolution reaction includes: (1) providing a substrate; (2) forming a precursor layer coating the substrate; and (3) forming, from the precursor layer, an electrocatalyst layer coating the substrate, thereby forming the anode including the substrate and the electrocatalyst layer, wherein forming the electrocatalyst layer is in the presence of an electrolyte solution including anions, and the anions are incorporated within the electrocatalyst layer.

In some embodiments, a method of manufacturing an anode for oxygen evolution reaction includes: (1) providing a substrate; and (2) affixing electrocatalyst particles to the substrate, wherein the electrocatalyst particles include polyatomic anions.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 3. Seawater splitting under harsh conditions. a, Durability tests at a substantially constant current of about 400 $mA/cm^2$ in about 1 M KOH+about 2 M NaCl electrolyte (about 4 times salt concentration of natural seawater) for electrolyzers paired by $Cr_2O_3$—Ni—NiO cathode and bare Ni foam, Ni foam/$Ni_3S_2$, Ni foam loaded with NiFe-LDH plates (non-continuous loading), Ni/$Ni_3S_2$ loaded with NiFe-LDH plates (non-continuously loading), Ni foam/electrodeposited continuous NiFe-LDH and Ni foam with dual-layer continuous/$Ni_3S_2$/electrodeposited NiFe-LDH anodes respectively. All the electrochemical data were not iR compensated (R=0.85+/−0.05 ohms). b, After about 300 h electrolysis in this harsh condition, the electrodeposited NiFe-LDH/$Ni_3S_2$/Ni foam electrode still showed structural integrity from photos (a white material above the anode was epoxy coating used to fill the Ni foam and prevent electrolyte from wicking upward out of the solution). c, Oxygen evolution reaction (OER) Relative Faradaic efficiency towards $O_2$ generation for the anodes in (a) in about 1 M KOH+about 2 M NaCl.

FIG. 5. a, X-ray diffraction of Ni/$Ni_2P$. b, SEM image of Ni/$Ni_2P$/NiFe-LDH. c, CV scans of Ni/$Ni_2P$/NiFe-LDH before and after about 45 h water splitting stability test in about 1 M KOH and about 1.5 M NaCl solution, at a scan rate of about 2 mV/s. d, Three-electrode water splitting stability test of Ni/$Ni_2P$/NiFe-LDH in about 1 M KOH and about 1.5 M NaCl electrolyte, at a substantially constant voltage of about 1.79 V vs. RHE, room temperature. e, About 550 h durability tests at a substantially constant current density of about 400 $mA/cm^2$ of the seawater splitting electrolyzer under about 6 M KOH+about 1.5 M NaCl at about 80° C. Note iR compensation was not applied to any experiment.

FIG. 19. a, LSV scans of Ni mesh-Fe dip-HC before and after 70 h stability test in about 1 M KOH electrolyte, at a scan rate about 5 mV/s. b, Three-electrodes stability test of Ni mesh-Fe dip-HC in about 1 M KOH electrolyte at a substantially constant voltage of about 1.81 V vs. RHE. c, Stability test of an electrolyzer paired by a Ni mesh-Fe dip-HC anode and a nickel mesh cathode in about 6 M KOH, about 0.5 M $K_2CO_3$, and about 1 M NaCl electrolyte, at a substantially constant current density of about 400 mA/cm², at about 80° C.

FIG. 20. a, Forward branch of CV scans of NiFe—HC, commercial $IrO_2$ and 20% Ir/C in $CO_2$ saturated about 0.5 M $KHCO_3$ electrolytes. The CV curves were taken between about 1.3-2 V vs. RHE at a scan rate of about 1 mV/s. Resistance was about 1.4 ohms and was not compensated. b, Chronopotentiometry of NiFe—HC electrode under OER operation at a substantially constant current of about 250 mA in $CO_2$ saturated about 0.5 M $KHCO_3$ electrolyte for 120 h (resistance of about 1.4 ohms, with iR compensation). c, LSV scans of NiFe—HC in $CO_2$ saturated about 0.5 M $KHCO_3$ and about 0.3 M NaCl electrolyte, pH=about 7.4, at a scan rate of about 5 mV/s, before and after the OER stability test. d, Three-electrodes OER stability test of NiFe—HC in $CO_2$ saturated about 0.5 M $KHCO_3$ and about 0.3 M NaCl electrolyte, pH=about 7.4, at a substantially constant current of 10 mA/cm².

DESCRIPTION

Embodiments of this disclosure are directed to electrochemical cells that can be operated to directly convert salty water into oxygen and hydrogen at practical current densities and temperatures, such as under conditions used in industrial water electrolysis, and without removal of chloride anions. Embodiments of this disclosure are also directed to components of such electrochemical cells, including electrodes, electrolytes, and their manufacturing methods, for highly sustained water splitting.

Figure 25:
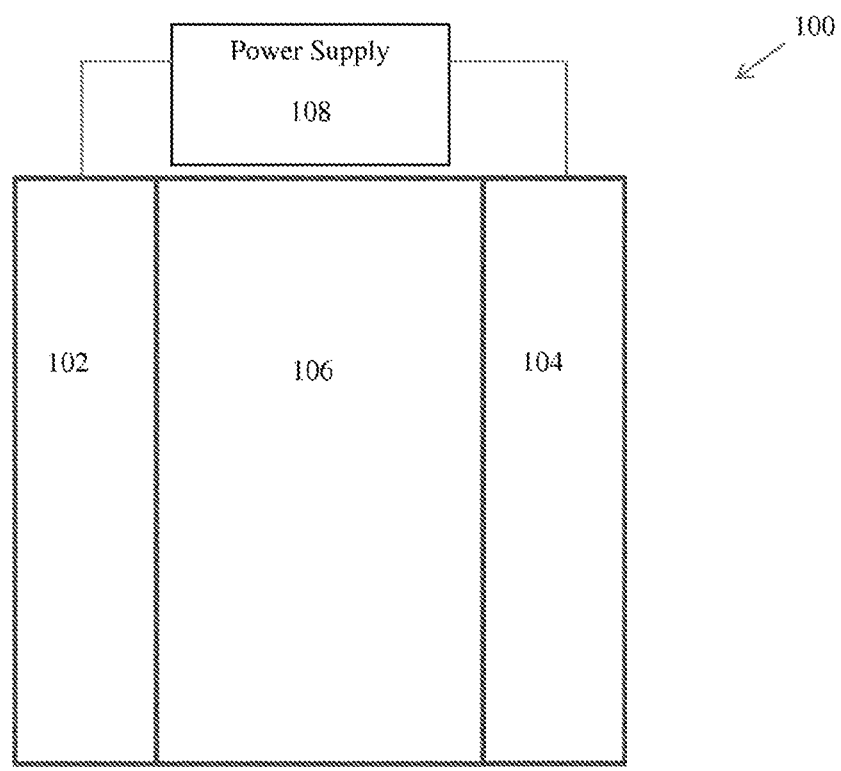
FIG. 25. Schematic of a water electrolyzer according to some embodiments.

FIG. 25 shows a water electrolyzer 100 that includes an anode 102, a cathode 104, and an electrolyte 106 disposed between and in contact with the anode 102 and the cathode 104, according to some embodiments. The anode 102 is configured to promote water oxidation or oxygen evolution reaction (OER) and includes an OER electrocatalyst affixed to a substrate. The cathode 104 is configured to promote water reduction or hydrogen evolution reaction (HER) and includes a HER electrocatalyst affixed to a substrate.

In some embodiments, the OER electrocatalyst included in the anode 102 includes a metal or mixed metal hydroxide, metal or mixed metal-layered double hydroxide, or a metal or mixed metal oxide. In some embodiments, the OER electrocatalyst includes a nickel hydroxide, a nickel-layered double hydroxide, a nickel iron hydroxide, a nickel iron-layered double hydroxide, a nickel manganese hydroxide, a nickel manganese-layered double hydroxide, a nickel chromium hydroxide, a nickel chromium-layered double hydroxide, a nickel iron chromium hydroxide, a nickel iron chromium-layered double hydroxide, a nickel cobalt hydroxide, a nickel cobalt-layered double hydroxide, a cobalt iron hydroxide, a cobalt iron-layered double hydroxide, a nickel iron cobalt hydroxide, a nickel iron cobalt-layered double hydroxide, iridum oxide, or a combination of two or more thereof. In some embodiments, the anode 102 includes an electrocatalyst layer (including a metal or mixed metal-layered double hydroxide such as nickel iron-layered double hydroxide) coating or covering (e.g., conformally coating or covering) the substrate. In some embodiments, a thickness of the electrocatalyst layer is in a range of about 10 nm to about 1000 nm, about 50 nm to about 800 nm, about 50 nm to about 600 nm, about 50 nm to about 400 nm, about 50 nm to about 200 nm, or about 100 nm to about 200 nm. In some embodiments, the electrocatalyst layer is amorphous or includes an amorphous phase. In some embodiments, the electrocatalyst layer is crystalline or includes a crystalline phase.

In some embodiments, the substrate included in the anode 102 is a metallic substrate, such as including nickel in the form of elemental nickel, a nickel-containing alloy (e.g., nickel iron alloy, nickel cobalt alloy, stainless steel, nickel chromium alloy, or nickel cobalt ferrous alloy), or a nickel-coated base substrate (e.g., nickel-coated iron substrate). In some embodiments, the substrate included in the anode 102 is a porous substrate. A porosity of the porous substrate can be represented as a ratio of a volume of voids relative to a total volume, namely between 0 and 1, or as a percentage between 0% and 100%. In some embodiments, the porous substrate can have a porosity that is at least about 0.05 or at least about 0.1 and up to about 0.98 or more, and, more particularly, the porosity can be in a range of about 0.1 to about 0.98, about 0.2 to about 0.98, about 0.3 to about 0.98, about 0.4 to about 0.95, about 0.5 to about 0.95, about 0.6 to about 0.95, or about 0.7 to about 0.95. Techniques for determining porosity include, for example, porosimetry and optical or scanning techniques. Examples of suitable porous substrates include metallic foams, such as nickel foams, nickel iron foams, nickel cobalt foams, and stainless steel (e.g., doped with molybdenum such as stainless steel 316) foams, and non-metallic foams, such as carbon foams, graphite foams, and graphene foams. Other catalyst supports or substrates can be included in place of, or in combination with, metallic or non-metallic foams, such as metallic or non-metallic foils or meshes, such as nickel foils or meshes, stainless steel foils or meshes, nickel chromium foils or meshes, or nickel cobalt ferrous alloy foils or meshes.

In some embodiments, the anode 102 also includes an anionic layer disposed between the substrate and the electrocatalyst layer. The anionic layer can impart enhanced cation-selectivity to the electrocatalyst layer and impart corrosion resistance to the underlying substrate by repelling chloride anions. In some embodiments, the anionic layer includes multivalent polyatomic anions having a negative charge state with an absolute value of 2 or greater, 3 or greater, or 4 or greater. Alternatively, or in conjunction, the anionic layer can include monovalent polyatomic anions such as bicarbonates ($HCO_3^-$), dihydrogen phosphates ($H_2PO_4^-$), or a combination thereof. In some embodiments, multivalent anions include an anionic oxide of an element of Group 16 of the Periodic Table, such as sulfur. In some embodiments, the multivalent anions include sulfates ($SO_4^{2-}$), sulfites ($SO_3^{2-}$), or a combination thereof. In some embodiments, the multivalent anions include an anionic oxide of an element of Group 15 of the Periodic Table, such as phosphorus. In some embodiments, the multivalent anions include phosphates ($PO_4^{3-}$), hydrogen phosphates ($HPO_4^{2-}$), or a combination thereof. In some embodiments, the multivalent anions include an anionic oxide of an element of Group 14 of the Periodic Table, such as carbon. In some embodiments, the multivalent anions include carbonates ($CO_3^{2-}$). In some embodiments, the multivalent anions include an anionic oxide of an element of Group 13 of the Periodic Table, such as boron. In some embodiments, the multivalent anions include borates. In some embodiments, the multivalent anions include an anionic oxide of a transition metal, such as molybdenum, tungsten, vanadium, or chromium. In some embodiments, the multivalent anions include molybdates, vanadates, or chromates.

In some embodiments, the anode 102 also includes a passivation layer disposed between the substrate and the electrocatalyst layer, and between the substrate and the anionic layer. The passivation layer can impart corrosion resistance to the underlying substrate, and can serve as a source of the anionic layer that is formed in situ. In some embodiments, the passivation layer is electrically conductive. In some embodiments, the passivation layer includes a metal or a combination of two or more different metals, such as nickel or nickel and iron. In some embodiments and in addition to a metal or a combination of two or more different metals, the passivation layer also includes an element of Group 16 of the Periodic Table, such as sulfur. In some embodiments, the passivation layer includes nickel sulfide or nickel iron sulfide. In some embodiments and in addition to a metal or a combination of two or more different metals, the passivation layer also includes an element of Group 15 of the Periodic Table, such as phosphorus. In some embodiments, the passivation layer includes nickel phosphide or nickel iron phosphide. In some embodiments, the passivation layer includes stainless steel. In some embodiments, a thickness of the passivation layer is in a range of about 200 nm to about 10 µm, about 500 nm to about 8 µm, about 500 nm to about 6 µm, about 500 nm to about 4 µm, about 500 nm to about 2 µm, or about 1 µm to about 2 µm. In some embodiments, the passivation layer is amorphous or includes an amorphous phase. In some embodiments, the passivation layer is crystalline or includes a crystalline phase.

In some embodiments, the electrocatalyst layer is itself passivating, such that a separate passivation layer or a separate anionic layer can be omitted. For example, anions can be included during formation of the electrocatalyst layer (e.g., during anodization) to yield the electrocatalyst layer including the anions. The anions can be intercalated within or otherwise incorporated within the electrocatalyst layer to impart corrosion resistance by repelling chloride anions. In some embodiments, the electrocatalyst layer includes an anion or mixture anion-intercalated metal or mixed metal hydroxide, an anion or mixture anion-intercalated metal or mixed metal-layered double hydroxide, or an anion or mixture anion-intercalated metal or mixed metal oxide, where anions can be monovalent polyatomic anions such as bicarbonates, multivalent anions such as sulfates, phosphates, carbonates, borates, molybdates, vanadates, or chromates, or a combination of two or more thereof. For example, the OER electrocatalyst includes a nickel hydroxide carbonate, sulfate, or phosphate; a nickel-layered double hydroxide carbonate, sulfate, or phosphate; a nickel iron hydroxide carbonate, sulfate, or phosphate; a nickel iron-layered double hydroxide carbonate, sulfate, or phosphate; a nickel manganese hydroxide carbonate, sulfate, or phosphate; a nickel manganese-layered double hydroxide carbonate, sulfate, or phosphate; a nickel chromium hydroxide carbonate, sulfate, or phosphate; a nickel chromium-layered double hydroxide carbonate, sulfate, or phosphate; a nickel iron chromium hydroxide carbonate, sulfate, or phosphate; a nickel iron chromium-layered double hydroxide carbonate, sulfate, or phosphate; a nickel cobalt hydroxide carbonate, sulfate, or phosphate; a nickel cobalt-layered double hydroxide carbonate, sulfate, or phosphate; a cobalt iron hydroxide carbonate, sulfate, or phosphate; a cobalt iron-layered double hydroxide carbonate, sulfate, or phosphate; a nickel iron cobalt hydroxide carbonate, sulfate, or phosphate; a nickel iron cobalt-layered double hydroxide carbonate, sulfate, or phosphate; carbonate, sulfate, or phosphate-intercalated iridum oxide, or a combination of two or more thereof.

In some embodiments, the HER electrocatalyst included in the cathode 104 includes a combination of nickel, nickel oxide, and chromium oxide. In some embodiments, the HER electrocatalyst is in the form of nanoparticles having sizes in a range from about 1 nm to about 200 nm, about 1 nm to about 150 nm, about 2 nm to about 100 nm, or about 2 nm to about 50 nm, and where each nanoparticle includes a core including nickel and nickel oxide, and a shell including chromium oxide covering the core. The HER electrocatalyst is affixed to a substrate, which can be implemented similarly as explained for the anode 102. Other HER electrocatalysts can be included in place of, or in combination with, nickel, nickel oxide, and chromium oxide.

The electrolyte 106 is an aqueous electrolyte and can be alkaline or neutral. As shown in FIG. 25, the electrolyte 106 can be alkaline seawater, such as seawater having potassium hydroxide added to elevate the pH (e.g., with a concentration of potassium hydroxide or other base in a range of about 0.5 M to about 6 M, about 1 M to about 6 M, about 0.5 M to about 4 M, about 0.5 M to about 2 M, or about 1 M to elevate the pH to greater than about 7, such as about 7.5 or greater, about 8 or greater, or about 9 or greater) and with a sodium chloride concentration in a range of about 0.5 M to about 2 M.

In some embodiments, anions can be included in the electrolyte 106 and can be dispersed in the alkaline seawater to impart corrosion resistance to the anode 102, such as through intercalation or otherwise incorporation within the electrocatalyst layer of the anode 102 during operation of the water electrolyzer 100. Anions can be monovalent polyatomic anions such as bicarbonates, multivalent polyatomic anions such as sulfates, phosphates, carbonates, borates, molybdates, vanadates, or chromates, or a combination of two or more thereof. A concentration of such anions in the electrolyte 106 can be in a range of about 0.05 M to about 8 M (or up to a maximum saturation concentration of such anions), about 0.05 M to about 6 M, about 0.1 M to about 4 M, about 0.05 M to about 2 M, about 0.1 M to about 2 M, or about 0.5 M to about 1 M. In the case of two or more different anions being included in the electrolyte 106, a total concentration of such anions can be within the foregoing stated ranges.

Referring to FIG. 25, the water electrolyzer 100 also includes a power supply 108, which is electrically connected to the anode 102 and the cathode 104 and is configured to supply electricity to promote OER and HER at the anode 102 and the cathode 104, respectively. The power supply 108 can include, for example, a primary or secondary battery or a solar cell. Although not shown in FIG. 25, a selectively permeable membrane or other partitioning component can be included to partition the anode 102 and the cathode 104 into respective compartments.

Advantageously, the water electrolyzer 100 can be operated to directly convert alkaline or neutral seawater to oxygen and hydrogen at a large current density (e.g., about 400 mA/cm$^2$ or greater), at a low applied voltage (e.g., about 2 V or less, or about 1.79 V vs. RHE), and for an extended duration (e.g., about 1000 hours or more), with high resistance towards corrosion and high stability against performance decay. The water electrolyzer 100 can be operated in a wide range of sodium chloride concentrations (e.g., about 0.5 M to 2 M) and a wide range of operating temperatures (e.g., about 23° C. to about 80° C.) with little or no noticeable formation of chlorine gas. Further, the water electrolyzer 100 can operate with high performance and corrosion resistance while omitting rare earth materials. Stabilization of the anode 102 also can be extended for other ions, such as against SCN$^-$, S$_2^-$, HCOO$^-$, and COO$^-$.

In some embodiments, an anode (e.g., the anode 102) to promote water oxidation or OER is formed according to a manufacturing method including: (1) providing a substrate; (2) forming a passivation layer coating or covering (e.g., conformally coating or covering) the substrate; and (3) forming an electrocatalyst layer coating or covering (e.g., conformally coating or covering) the passivation layer, thereby forming the anode including the substrate, the passivation layer, and the electrocatalyst layer. In some embodiments, forming the passivation layer in (2) includes immersing or otherwise exposing the substrate to a precursor solution and heating the substrate and the precursor solution, such as to a temperature in a range of about 80° C. to about 200° C., about 100° C. to about 180° C., or about 150° C. for a time duration in a range of about 1 hour to about 10 hours, about 2 hours to about 8 hours, or about 5 hours. In some embodiments, the precursor solution includes an element of Group 16 of the Periodic Table, such as sulfur. In some embodiments, the precursor solution includes an element of Group 15 of the Periodic Table, such as phosphorus. In some embodiments, the precursor solution includes an element of Group 14 of the Periodic Table, such as carbon. In some embodiments, the precursor solution includes an element of Group 13 of the Periodic Table, such as boron. In some embodiments, forming the electrocatalyst layer in (3) is performed by electrodeposition. In some embodiments, the method further includes applying a current to the anode to form an anionic layer disposed between the passivation layer and the electrocatalyst layer.

In some embodiments, an anode (e.g., the anode 102) to promote water oxidation or OER is formed according to a manufacturing method including: (1) providing a substrate; and (2) forming an electrocatalyst layer coating or covering (e.g., conformally coating or covering) the substrate, thereby forming the anode including the substrate and the electrocatalyst layer. In some embodiments, the electrocatalyst layer is formed directly on the substrate in (2). In some embodiments, forming the electrocatalyst layer in (2) is performed by electrodeposition. In some embodiments, the substrate includes a transition metal as a dopant in the substrate, and the method further includes applying a current to the anode to form an anionic layer disposed between the substrate and the electrocatalyst layer, where the anionic layer includes an anionic oxide of the transition metal.

In some embodiments, an anode (e.g., the anode 102) to promote water oxidation or OER is formed according to a manufacturing method including: (1) providing a substrate; and (2) forming an electrocatalyst layer coating or covering (e.g., conformally coating or covering) the substrate, thereby forming the anode including the substrate and the electrocatalyst layer, where forming the electrocatalyst layer is in the presence of an electrolyte solution (e.g., an aqueous electrolyte solution) including anions, and the anions are intercalated within or otherwise incorporated within the electrocatalyst layer. Anions can be monovalent polyatomic anions such as bicarbonates, multivalent polyatomic anions such as sulfates, phosphates, carbonates, borates, molybdates, vanadates, or chromates, or a combination of two or more thereof. A concentration of such anions in the electrolyte solution can be in a range of about 0.01 M to about 4 M, about 0.05 M to about 4 M, about 0.1 M to about 4 M, about 0.1 M to about 2 M, or about 0.1 M to about 1 M. In the case of two or more different anions being included in the electrolyte solution, a total concentration of such anions can be within the foregoing stated ranges. A pH of the electrolyte solution can be in a range of about 4 to about 13. In some embodiments, forming the electrocatalyst layer in (2) is performed by anodization of the substrate while the substrate is immersed or otherwise exposed to the electrolyte solution to form the electrocatalyst layer on, at, or adjacent to a surface of the substrate. In some embodiments, forming the electrocatalyst layer by anodization includes applying a current (e.g., anodization current) to the substrate, where the current can be in a range of about 10 mA/cm$^2$ to about 400 mA/cm$^2$, about 10 mA/cm$^2$ to about 350 mA/cm$^2$, or about 10 mA/cm$^2$ to about 300 mA/cm$^2$, and where anodization is performed at a temperature in a range of about 20° C. to about 100° C., about 40° C. to about 100° C., or about 60° C. to about 100° C.

In some embodiments, an anode (e.g., the anode 102) to promote water oxidation or OER is formed according to a manufacturing method including: (1) providing a substrate; (2) (2) forming a precursor layer coating or covering (e.g., conformally coating or covering) the substrate; and (3) forming, from the precursor layer, an electrocatalyst layer coating or covering (e.g., conformally coating or covering) the substrate, thereby forming the anode including the substrate and the electrocatalyst layer, where forming the electrocatalyst layer is in the presence of an electrolyte solution (e.g., an aqueous electrolyte solution) including anions, and the anions are intercalated within or otherwise incorporated within the electrocatalyst layer. In some embodiments, the substrate includes a first metal, and forming the precursor layer in (2) includes immersing or otherwise exposing the substrate to a precursor solution including at least one second metal different from the first metal, followed by drying or heating the substrate. In some embodiments, the first metal is nickel. In some embodiments, the second metal is iron, manganese, chromium, or cobalt. In some embodiments, the precursor layer is a mixed metal cationic layer including cations of the first metal and cations of the second metal. Anions can be monovalent polyatomic anions such as bicarbonates, multivalent polyatomic anions such as sulfates, phosphates, carbonates, borates, molybdates, vanadates, or chromates, or a combination of two or more thereof. A concentration of such anions in the electrolyte solution can be in a range of about 0.01 M to about 4 M, about 0.05 M to about 4 M, about 0.1 M to about 4 M, about 0.1 M to about 2 M, or about 0.1 M to about 1 M. In the case of two or more different anions being included in the electrolyte solution, a total concentration of such anions can be within the foregoing stated ranges. A pH of the electrolyte solution can be in a range of about 4 to about 13. In some embodiments, forming the electrocatalyst layer in (3) is performed by anodization of the substrate while the substrate is immersed or otherwise exposed to the electrolyte solution to form the electrocatalyst layer on, at, or adjacent to a surface of the substrate. In some embodiments, forming the electrocatalyst layer by anodization includes applying a current (e.g., anodization current) to the substrate, where the current can be in a range of about 10 mA/cm$^2$ to about 400 mA/cm$^2$, about 10 mA/cm$^2$ to about 350 mA/cm$^2$, or about 10 mA/cm$^2$ to about 300 mA/cm$^2$, and where anodization is performed at a temperature in a range of about 20° C. to about 100° C., about 40° C. to about 100° C., or about 60° C. to about 100° C.

In some embodiments, an electrocatalyst layer formed according to the foregoing methods can be removed from an initial substrate, processed into a particulate form as electrocatalyst particles, and then used to form an anode, by affixing the electrocatalyst particles to another substrate. In some embodiments, the electrocatalyst particles include an anion-intercalated metal or mixed metal hydroxide, an anion-intercalated metal or mixed metal-layered double hydroxide, or an anion-intercalated metal or mixed metal oxide, where anions can be monovalent polyatomic anions such as bicarbonates, multivalent anions such as sulfates, phosphates, carbonates, borates, molybdates, vanadates, or chromates, or a combination of two or more thereof. In some embodiments, the electrocatalyst particles have sizes in a range from about 1 nm to about 1 µm, about 1 nm to about 500 nm, about 1 nm to about 300 nm, about 1 nm to about 200 nm, or about 1 nm to about 100 nm. In some embodiments, affixing the electrocatalyst particles to the other substrate is performed by coating (e.g., drop casting or spraying) the electrocatalyst particles along with a binder, followed by drying or heating to a temperature in a range of about 70° C. to about 200° C. In some embodiments, the other substrate is a metallic substrate, such as including nickel in the form of a nickel foam, foil, or mesh.

In some embodiments, an electrolyte (e.g., the electrolyte 106) for seawater electrolysis is formed according to a manufacturing method including: (1) combining seawater and a solution of potassium hydroxide (or other base) to form a combined solution, followed by filtration to remove precipitates (e.g., precipitated alkaline earth and heavy metal ions removed by filtration); (2) adding potassium hydroxide (or other base) to the combined solution to attain a desired pH or a desired concentration of potassium hydroxide (or other base); and (3) adding anions to the combined solution to yield the electrolyte. The desired concentration of potassium hydroxide (or other base) can be in a range of about 0.5 M to about 6 M, about 1 M to about 6 M, about 0.5 M to about 4 M, about 0.5 M to about 2 M, or about 1 M to elevate the pH to greater than about 7, such as about 7.5 or greater, about 8 or greater, or about 9 or greater. Anions can be monovalent polyatomic anions such as bicarbonates, multivalent polyatomic anions such as sulfates, phosphates, carbonates, borates, molybdates, vanadates, or chromates, or a combination of two or more thereof. A concentration of such anions in the electrolyte can be in a range of about 0.05 M to about 8 M (or up to a maximum saturation concentration of such anions), about 0.05 M to about 6 M, about 0.1 M to about 4 M, about 0.1 M to about 2 M, or about 0.5 M to about 1 M. In the case of two or more different anions being included in the electrolyte, a total concentration of such anions can be within the foregoing stated ranges. Such anions can be added to the combined solution in the form of alkali metal salts of such anions, such as lithium, sodium, potassium, rubidium, or cesium salts of such anions.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Highly Sustained, Energy Efficient Splitting of Seawater

Overview

This example presents a dual-layer anode composed of an amorphous NiFe-layered double hydroxide (LDH) electrocatalyst layer uniformly coated on a conductive $Ni_3S_2$ passivation layer formed on a porous Ni foam (NiFe-LDH/$Ni_3S_2$/Ni), achieving highly stable and energy efficient seawater electrolysis. The anode is highly active, corrosion-resistant and substantially 100% selective (without $Cl_2$ evolution) for oxygen evolution reaction (OER) in alkaline seawater electrolytes. When paired with a hydrogen evolution reaction (HER) electrocatalyst, a high electrolysis current density of about 400 mA/cm$^2$ is achieved for stable alkaline seawater splitting without decay over 1000 hours under an applied voltage of about 1.72 V. A continuous, highly OER active NiFe electrocatalyst layer drawing anodic currents towards water oxidation, and a chloride-repelling sulfate-containing anionic interface formed between the NiFe and $Ni_3S_2$ passivation layers are responsible for a superior corrosion resistant anode in salty water.

Discussion and Results

Storing renewable energy by driving uphill chemical reactions is an attractive solution to the intermittency problem faced by many alternative energy sources. Due to its high gravimetric energy density (about 142 MJ/Kg) and pollution-free use, hydrogen is considered one of the most promising clean energy carriers. Electrolysis of water is a clean and effective way to generate hydrogen at a cathode but is highly dependent on efficient and stable oxygen evolution reaction (OER) at an anode.

If water splitting is utilized to store a substantial portion of the world's energy, water distribution issues may arise if vast amounts of purified water are used for fuel formation. Seawater, which occupies about 97% of the earth's water reserves, is the most abundant aqueous electrolyte feedstock on earth but its implementation in the water splitting process presents many challenges, especially for the anodic reaction. The most serious issues are caused by the chloride anions (about 0.5 M in seawater). First, the chloride anions present a selectivity issue. At pH=0, the oxygen evolution and chlorine evolution equilibrium potentials vs. the normal hydrogen electrode (NHE) are separated by about 130 mV (OER, $E_0$=1.23 V, pH=0 vs. NHE; chlorine evolution reaction (ClER), $E_0$=1.36 V vs. NHE, pH=0). In addition, OER is a four-electron oxidation (Eq. 1) involving a high overpotential while ClER is a facile two-electron oxidation (Eq. 2), giving ClER a significant kinetic advantage.

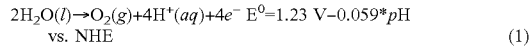

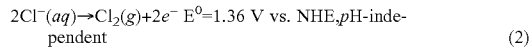

While chlorine is a high-value chemical product and is generated intentionally in the chloralkali process, the amount of chlorine that would be generated to supply the world with hydrogen would quickly exceed demand and result in a large excess of a toxic chemical. Because the equilibrium potential of chlorine evolution does not depend on pH, operating in alkaline electrolytes can alleviate the ClER selectivity issue. Unfortunately, increasing the pH does not completely avoid chloride oxidation reactions because hypochlorite formation (Eq. 3) can still compete with OER (Eq. 4) in alkaline conditions. However, the voltage gap (about 480 mV in 0.5 M NaCl) between alkaline OER and hypochlorite formation is much larger than the ClER-OER gap in acidic condition. As a result, an OER catalyst can operate at η<480 mV in high pH without chloride oxidation reactions becoming a problem.

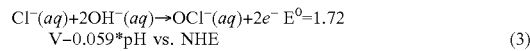

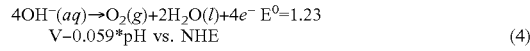

In addition to ClER and other chloride oxidation problems, aggressive chloride anions in seawater can corrode many catalysts and substrates (especially metals) under the strong oxidizing potentials involved for OER. Without relying on costly desalination processes, development of electrodes that are highly active and stable for splitting seawater into $H_2$ and $O_2$ is desired for the advancement of seawater electrolysis.

An approach to solving the aforementioned challenges is two-fold. First, operation is performed in alkaline-adjusted seawater electrolytes with a highly active OER catalyst at much lower voltages than involved for chloride oxidation reactions. Second, a dual-layer NiFe-LDH/$Ni_3S_2$/Ni foam anode is developed that is highly active and corrosion resistant for the oxygen evolution reaction in chloride-containing alkaline electrolytes. The NiFe-LDH serves as an active OER catalyst as well as a protecting layer together with the underlying $Ni_3S_2$ against Cl$^-$ attack. When the anode is paired with an advanced Ni/NiO/$Cr_2O_3$ hydrogen evolution cathode, the electrolyzer can operate at about 400 mA/cm$^2$ with a high selectivity for oxygen generation and last more than about 1000 hours in alkaline seawater (or salt-saturated seawater) without noticeable anode corrosion or activity loss.

Figure 1:
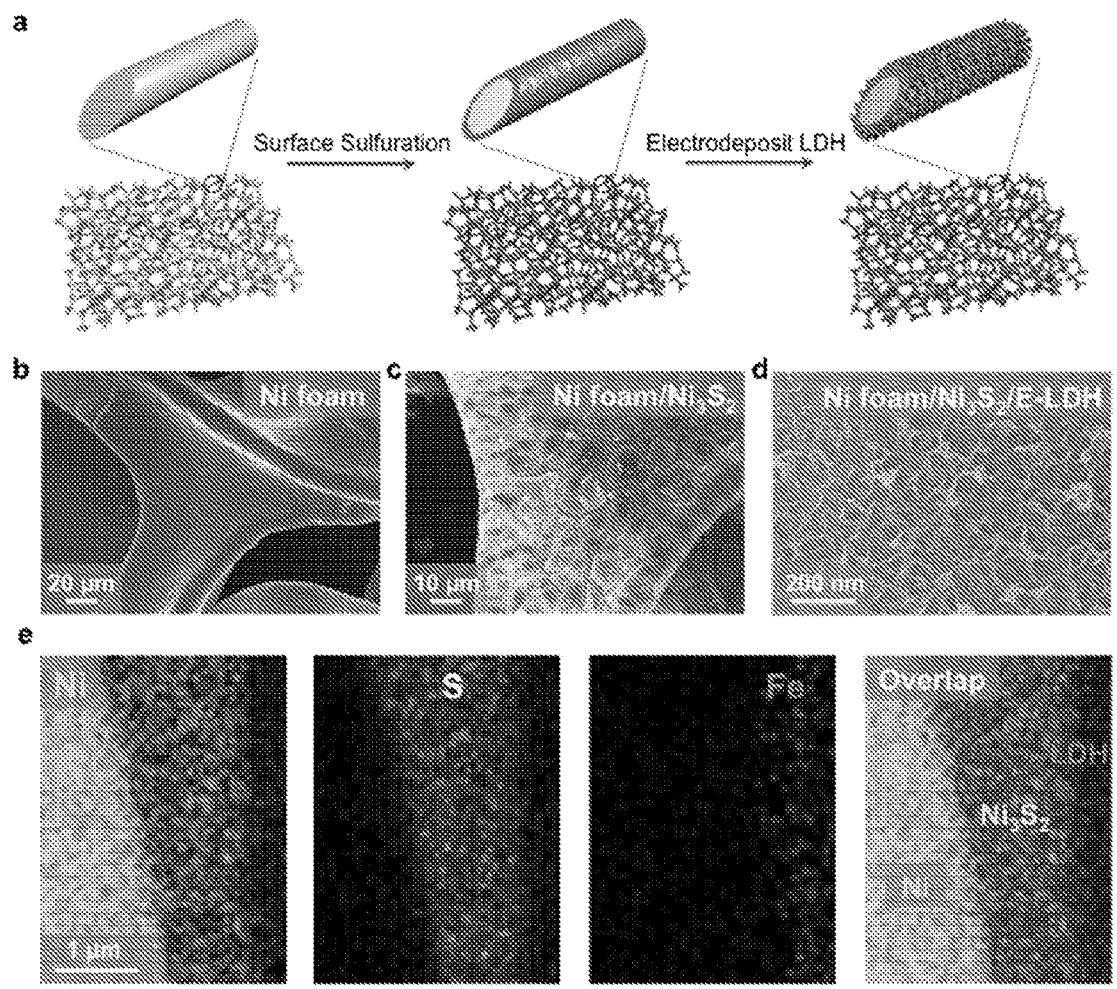
FIG. 1. Fabrication and structure of dual-layer NiFe-layered double hydroxide (LDH)/$Ni_3S_2$ on Ni foam anode for seawater splitting. a, Schematic drawing of the fabrication process, including a surface sulfurization stage and an in situ electrodeposition of NiFe-LDH. b, c and d, Scanning electron microscopy (SEM) images of untreated nickel foam, $Ni_3S_2$ formed on nickel foam and electrodeposited NiFe-LDH on the $Ni_3S_2$ surface. e, Elemental mapping of cross section of NiFe-LDH/$Ni_3S_2$ on a Ni wire in the Ni foam, revealing Ni wire, $Ni_3S_2$ and NiFe-LDH layers.
Figure 9A:
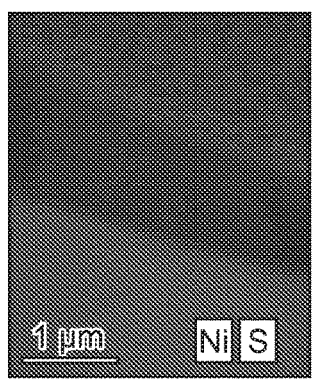
FIG. 9. a, b, c, Cross sectional elemental mapping of Ni/$Ni_3S_2$.
Figure 9B:
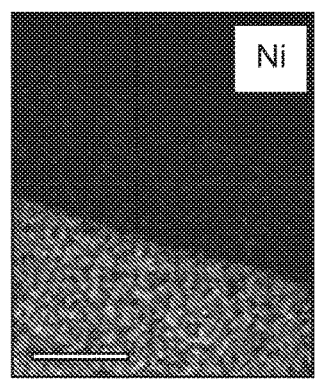
Figure 9C:
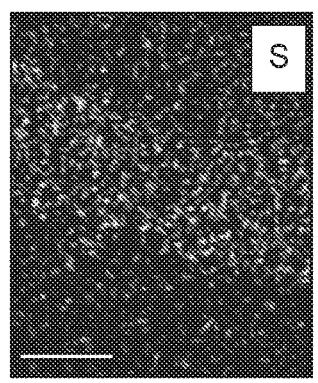

The NiFe-LDH/$Ni_3S_2$/Ni foam anode was formed by first converting the surface of Ni foam to $Ni_3S_2$ by a solvothermal sulfur treatment method in toluene (synthesis details in Methods). After formation of the $Ni_3S_2$ layer, OER active NiFe-LDH was electrodeposited via the reduction of nitrate from a solution of $Ni(NO_3)_2$ and $Fe(NO_3)_3$ (Ni:Fe=about 3:1) (FIG. 1a). Electron diffraction (ED) patterns revealed local $Ni_3S_2$ and NiFe-LDH lattice ordering while X-ray diffraction revealed no noticeable crystalline phase in the dual layers, indicating that the $Ni_3S_2$ and NiFe-LDH layers were amorphous in nature (FIG. 8). Scanning electron microscopy (SEM) images (FIG. 1b, 1c) and cross sectional elemental mapping revealed an about 1-2 μm thick $Ni_3S_2$ layer formed on the Ni foam (FIG. 9) and an about 100-200 nm thick NiFe-LDH layer uniformly formed on top of the $Ni_3S_2$ layer (FIG. 1d). Importantly, even though the $Ni_3S_2$ layer was thick, the conductivity of the electrode was comparable to a bare Ni foam due to the high electrical conductivity of $Ni_3S_2$ containing a Ni—Ni bonding network.

Figure 2A:
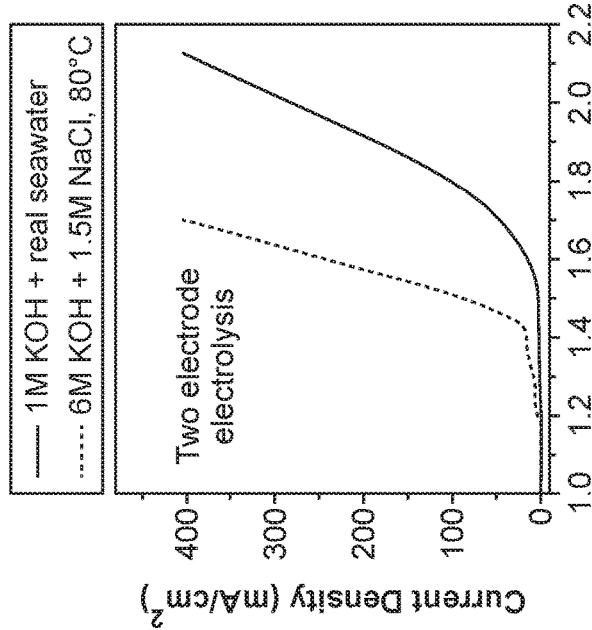
FIG. 2. Sustained, energy efficient seawater splitting continuously over about 1000 h. a, Cyclic voltammetry (CV) scans of NiFe-LDH/$Ni_3S_2$ on Ni foam electrode before and after about 1000 h seawater splitting, where the CV curves were taken between about 1.0 V to about 1.8 V (vs. reversible hydrogen electrode (RHE)) in an alkaline simulated seawater electrolyte (about 1 M KOH with about 0.5 M NaCl in deionized water) resistance: 0.7+/−0.05 ohm. b, Linear sweep voltammetry (LSV) scans of a seawater splitting electrolyzer (paired with a $Cr_2O_3$—Ni—NiO cathode) taken in alkaline seawater electrolyte (about 1 M KOH plus real seawater) at room temperature (about 23° C., resistance: 0.85+/−0.05 ohm) and in near-saturated salt concentration (about 1.5 M NaCl) under industrial electrolysis condition (about 6 M KOH electrolyte at about 80° C., resistance: 0.55+/−0.05 ohm). c, About 1000 h durability tests recorded after an activation period of several hours at a substantially constant current of about 400 $mA/cm^2$ of the seawater splitting electrolyzer under about 1 M KOH+real seawater at room temperature (R=0.95+/−0.05 ohms), about 1 M KOH+ about 1.5 M NaCl at room temperature (R=0.8+/−0.05 ohms), and about 6 M KOH electrolyte at about 80° C. (R=0.55+/−0.05 ohms), respectively. Note iR compensation was not applied to any experiment.
Figure 10:
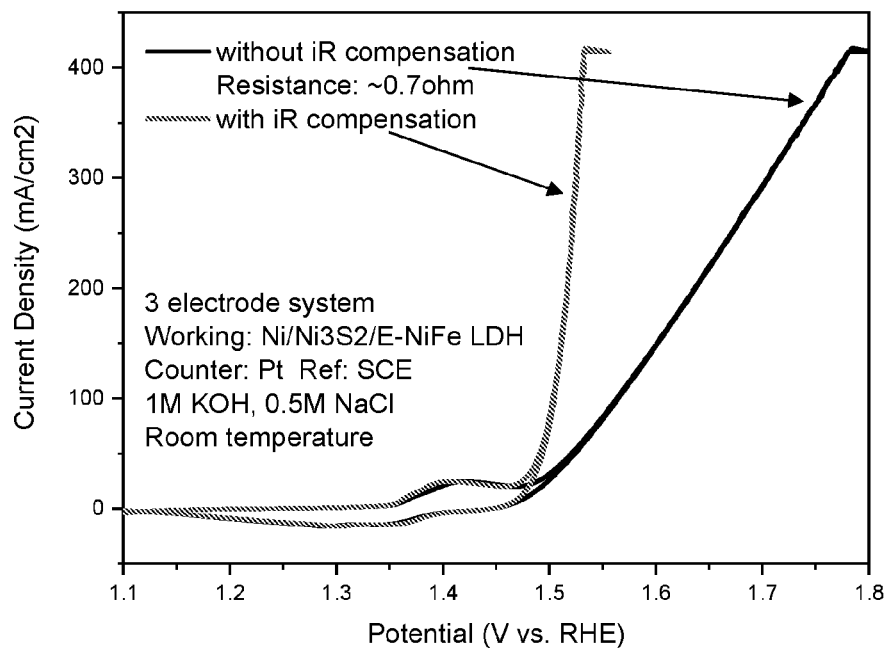
FIG. 10. OER performance of Ni/$Ni_3S_2$/NiFe-LDH in about 1 M KOH+about 0.5 M NaCl.

The OER performance was first measured in a three-electrode configuration in an alkaline simulated seawater electrolyte (about 1 M KOH with about 0.5 M NaCl in deionized water, FIG. 2a). Cyclic voltammetry (CV) with the Ni foam/$Ni_3S_2$/NiFe-LDH showed an onset overpotential of about 220 mV, among the best LDH-based catalyst in alkaline media. A high current density of about 400 mA/cm$^2$ at an overpotential of η=about 510 mV was reached without iR compensation (R=0.7+/−0.05 ohm). After iR compensation, the actual overpotential applied on Ni/$Ni_3S_2$/NiFe-LDH to achieve an OER current density of about 400 mA/cm$^2$ was as low as about 0.3 V (FIG. 10), far below the about 0.48 V overpotential to trigger chloride oxidation reaction.

Figure 2B:
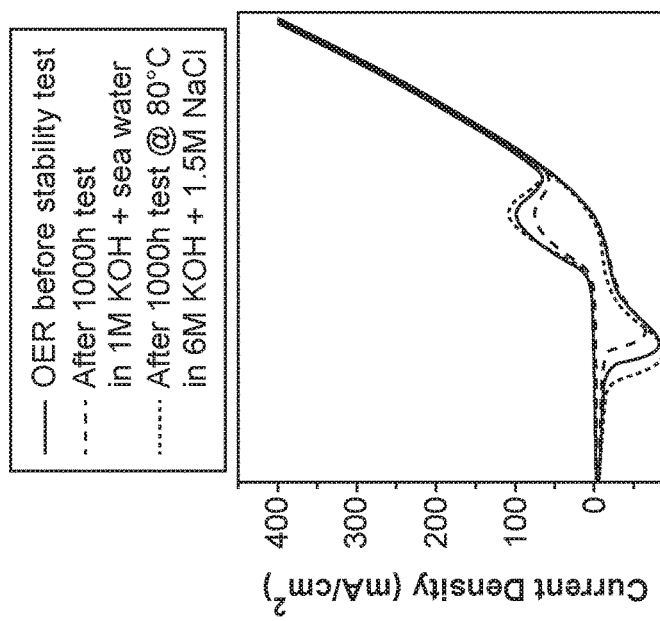

With the OER activity of the Ni/$Ni_3S_2$/NiFe-LDH verified, the electrode is paired with a highly active $Cr_2O_3$—Ni—NiO hydrogen evolution catalyst for two-electrode high current electrolysis of alkaline seawater. The experiment was first carried out in about 1 M KOH added to seawater from the San Francisco Bay at room temperature (about 23° C.) (a series resistance of 0.95+/−0.05 ohm, within 0.1 ohm of the untreated Ni foam). Without iR compensation, the electrolyzer achieved a current density of about 400 mA/cm$^2$ under a voltage of about 2.12 V (FIG. 2b). Impressively, the electrolyzer could operate continuously at about 400 mA/cm$^2$ for more than about 1000 hours without noticeable decay (FIG. 2c), consistent with three-electrode measurements before and after the about 1000 h stability test (FIG. 2a).

Figure 11:
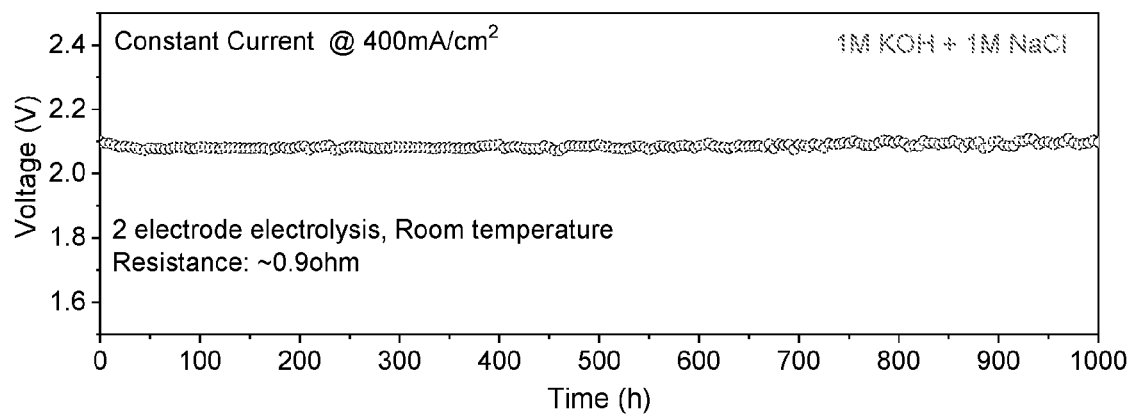
FIG. 11. Substantially constant current electrolysis of about 1 M KOH+about 1 M NaCl with Ni/$Ni_3S_2$/NiFe-LDH at about 23° C.

In practical electrolysis application, salt may accumulate in the electrolyte if seawater is continuously fed to the system and water is converted to $H_2$ and $O_2$. To this end, investigation is performed of electrolysis in electrolytes with higher NaCl concentration than in natural seawater. The first test involved the use of deionized water with about 1 M KOH+about 1 M NaCl (roughly 2× of the salt concentration of real seawater) (FIG. 11). Due to the increase in ionic strength from higher NaCl concentration, the cell resistance decreased (by about 0.1 ohm) and the electrolyzer reached a current density of about 400 mA/cm$^2$ under a voltage of about 2.09 V. The electrolysis was still very stable for more than about 1000 h, with no noticeable corrosion or voltage increase observed. Similarly, stable electrolysis was achieved when the concentration of NaCl is further increased to about 1.5 M (FIG. 2c), three times that of seawater, demonstrating an impressively active and stable electrolyzer in highly salty water.

Figure 12:
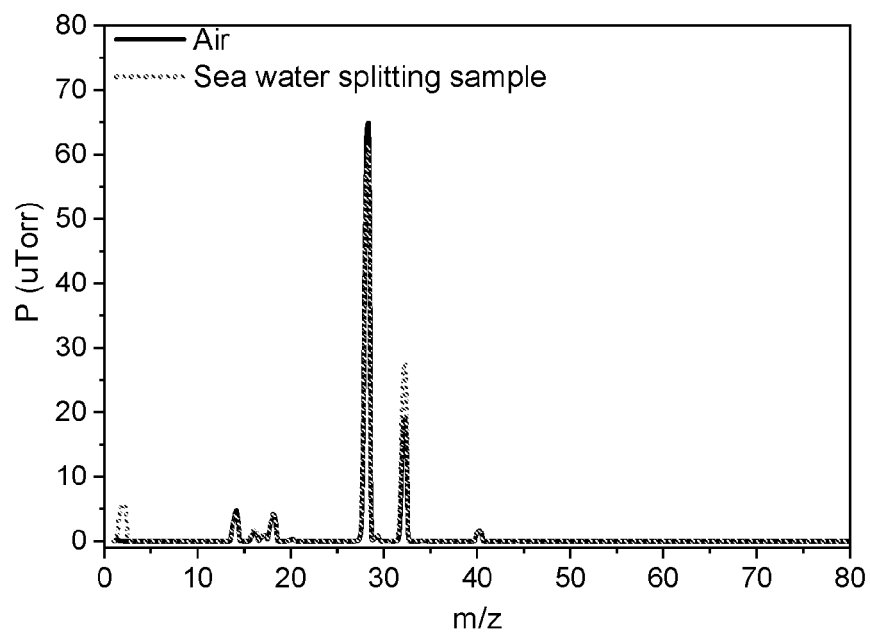
FIG. 12. Mass spectra of air vs. headspace sample during electrolysis by Ni/$Ni_3S_2$/NiFe-LDH in about 1 M KOH+ about 1.5 M NaCl (about 23° C.).

To verify that electrolysis was producing $O_2$ and not $Cl_2$ or other chlorine oxyanions, gas chromatography and mass spectrometry are employed. Once reaching steady electrolysis after an initial activation phase of about 24 h, mass spectra of the gas products sampled during electrolysis in about 1 M KOH+about 1.5 M NaCl showed that no signal for $Cl_2$ appeared at m/z=71 (FIG. 12). ClO$^-$ generation also can be ruled out at the anode since it would react with Cl$^-$ in solution via:

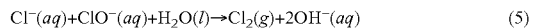

$$Cl^-(aq)+ClO^-(aq)+H_2O(l) \rightarrow Cl_2(g)+2OH^-(aq) \quad (5)$$

Figure 13:
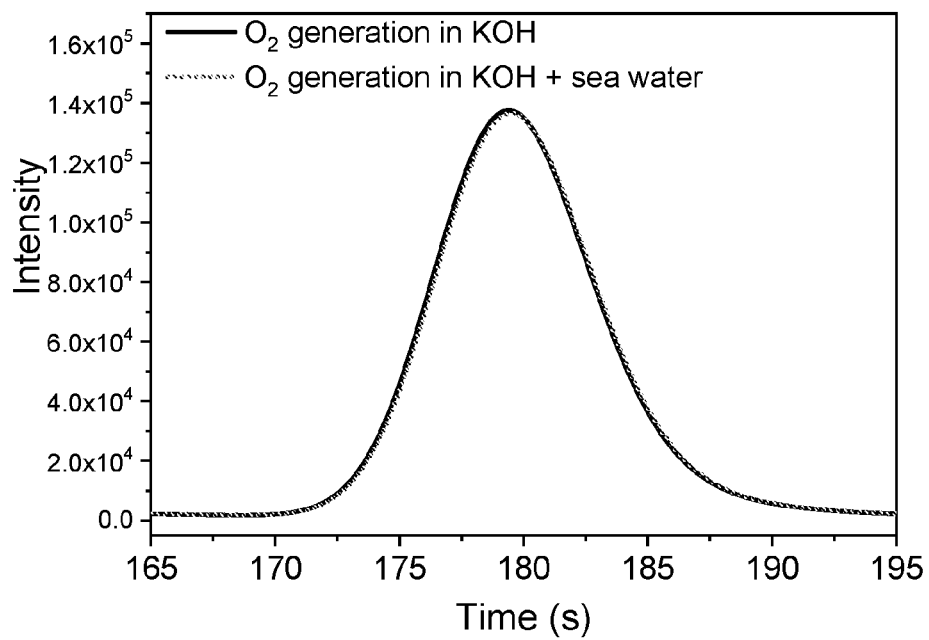
FIG. 13. Gas chromatographic $O_2$ signal at about 400 $mA/cm^2$ in about 1 M KOH and about 1 M KOH+seawater using Ni/$Ni_3S_2$/NiFe-LDH.

The lack of chloride oxidation was consistent with the high selectivity for OER evidenced by Faradaic efficiency measurements by gas chromatography (FIG. 13). A Relative Faradaic Efficiency (R_FE) is specified as the ratio of oxygen generation in KOH+salt electrolyte to a pure KOH electrolyte, as OER with NiFe-LDH catalysts can have a Faradaic efficiency of nearly 100% in pure KOH electrolytes. Indeed, NiFe-LDH/Ni$_3$S$_2$/Ni foam anode showed substantially the same OER-FE in about 1 M KOH and about 1 M KOH+about 1.5 M NaCl electrolytes, confirming high selectivity for OER in the presence of NaCl.

Figure 2C:
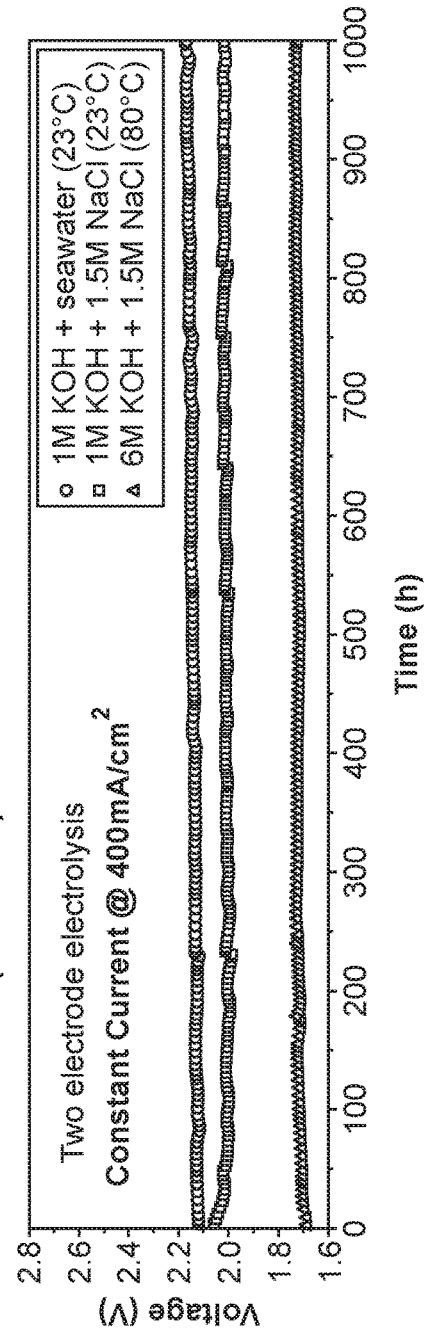

For industrial electrolysis, about 6 M KOH and a high temperature (about 80° C.) are typically used to decrease the electrolyte resistance and reduce electrical power consumption. To mimic these conditions, the two-electrode cell is tested in about 6 M KOH+about 1.5 M NaCl (near NaCl saturation point in about 6 M KOH) at about 80° C. The high ionic strength and temperature resulted in a low cell resistance of 0.55+/−0.05 ohm and the resulting performance was further improved over the about 1 M KOH+about 1.5 M NaCl at room temperature. In this case, about 1.72 V was sufficient to maintain a current density of about 400 mA/cm$^2$ (FIG. 2b). Meanwhile, electrolysis was still stable for more than about 1000 hours without any noticeable corrosion or activity loss (FIG. 2a, 2c). The overall energy efficiency was calculated to be about 68.6% for seawater splitting into $H_2$ and $O_2$, higher than under the about 1 M KOH+room temperature condition (about 58% to about 60%).

To understand the high durability and selectivity of the anode in alkaline salty water, synthesis is performed of several control samples for OER in about 1 M KOH+about 2 M NaCl electrolyte (four times the concentration of seawater) and paired with the Cr$_2$O$_3$—Ni—NiO cathode. This harsh testing condition (due to the high 2 M NaCl concentration) was chosen to expedite corrosion and determine which material had the best stability for practical applications. It is observed that for electrolysis in this electrolyte, the NiFe-LDH/Ni$_3$S$_2$/Ni foam anode paired with Cr$_2$O$_3$—Ni—NiO cathode lasted about 600 hours (FIG. 3a), with a relative OER Faradaic efficiency of about 99.9% (FIG. 3c). About 0.1% of the total current was involved in the slow etching and corrosion of the anode.

In the same electrolyte, testing is performed of bare Ni foam without Ni$_3$S$_2$ and NiFe-LDH layers. Ni foam failed within about 8-9 minutes (FIG. 3a, inset) and showed an R_FE for $O_2$ of less than about 30% (FIG. 3c). Ni foam treated with S to form Ni$_3$S$_2$ but without NiFe-LDH lasted for about 18-19 minutes (FIG. 3a, inset), indicating higher Ni$_3$S$_2$ corrosion resistance than Ni but still inferior to the Ni foam/Ni$_3$S$_2$/NiFe-LDH electrode. Electrodeposition is performed of NiFe-LDH on the bare Ni foam and it is observed that the electrode lasted about 12 h with an R_FE for $O_2$ of about 99% at about 400 mA/cm$^2$ (FIG. 3a). Clearly, the continuous, conformal OER active NiFe catalyst layer played a key role in stabilizing the anode, although the protection was imperfect when the Ni foam was used to support the NiFe-LDH instead of sulfurized Ni foam. Synthesis is performed of a NiFe-LDH nanoplate catalyst and it is loaded into the sulfur-treated Ni foam to form a discontinuous catalyst layer. This electrode survived for about 8.5 h (FIG. 3a) with an R_FE for $O_2$ greater than about 99% at about 400 mA/cm$^2$, worse than the about 600 h stability achieved by the Ni/Ni$_3$S$_2$ with electrodeposited NiFe-LDH. These results showed the strong synergy between the Ni$_3$S$_2$ layer and the continuously electrodeposited NiFe-LDH coating in affording ultra-high stability of the NiFe-LDH/Ni$_3$S$_2$/Ni foam anode even in an electrolyte containing about four times the NaCl concentration of seawater.

Figures 4A, 4B, 4C, 4D:
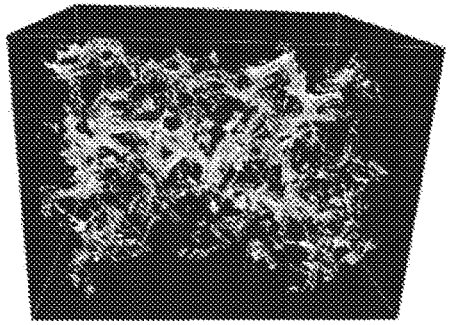
FIG. 4. Structural characterization and anti-corrosion mechanisms. a, b, c, Three-dimensional X-ray micro tomography of electrodeposited NiFe-LDH/$Ni_3S_2$/Ni foam anode (a) before seawater splitting, (b) after about 1000 h stability test in about 1 M KOH+real seawater, and (c) after about 300 h stability test in about 1 M KOH+about 4 times salt concentration of natural seawater (about 2 M NaCl), revealing little/slow corrosion on the anode. d, Ni foam with electrodeposited LDH (but without $Ni_3S_2$) after about 8 h of stability test in about 1 M KOH+about 2 M NaCl, showing clear corrosion. e, Raman spectra of electrodeposited NiFe-LDH/$Ni_3S_2$ before and after about 1000 h seawater splitting, indicating formation of a sulfate layer. f, In the first several hours of electrolysis, three-electrode experiment of electrodeposited NiFe-LDH/$Ni_3S_2$/Ni foam anode in about 1 M KOH+about 2 M NaCl showing early decrease in voltage that may correspond to the formation of a sulfate layer. g, OER Relative Faradaic Efficiency plots for $O_2$ production taken during (f). Decrease in voltage at about 2 h corresponds with a small decrease in Relative Faradaic Efficiency, indicative of sulfate layer formation between NiFe-LDH and $Ni_3S_2$.
Figure 14C:
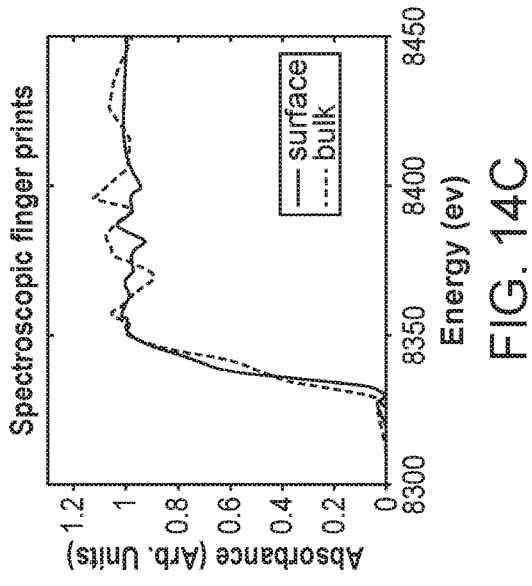
FIG. 14. X-ray absorption near edge structure (XANES) mapping and absorption spectra of Ni/$Ni_3S_2$/NiFe-LDH. a, b, Spectra (a) before electrolysis and (b) after electrolysis. c, Chemical finger print of surface and bulk composition are shown, indicating formation of $Ni_2S_3$. However, the LDH layer is too thin for X-Ray detection, and thus the outmost LDH layer was not noticeable on this XANES mapping.
Figures 14A, 14B:
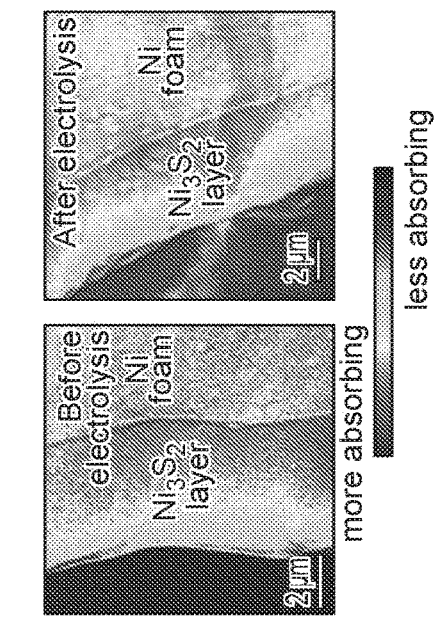

The electrode structures (before and after seawater splitting) were investigated by three-dimensional (3D) X-ray micro tomography (FIG. 4a-d) and two-dimensional (2D) nanoscale mapping of absorption near edge structure (FIG. 14). After about 1000 h electrolysis, the NiFe-LDH/Ni$_3$S$_2$/Ni foam anode showed a similar structural integrity (FIG. 4b) to before electrolysis (FIG. 4a). Even under a harsh condition with about 4 times the salt concentration of seawater for about 300 h, the anode still maintained the Ni foam skeleton structure (FIG. 4c). However, Ni foam without sulfurization but with electrodeposited NiFe-LDH (the best control sample) showed severe corrosion after an about 8 h test in about 1 M KOH+about 2 M NaCl (FIG. 4d). These results again indicated that Ni$_3$S$_2$ played a key role in preventing corrosion. Elemental X-ray absorption near edge structure (XANES) mapping of the sulfide layer was collected without noticeable change found after seawater splitting (FIG. 14), indicating the Ni$_3$S$_2$ layer remained largely intact.

Figures 4E, 4F:
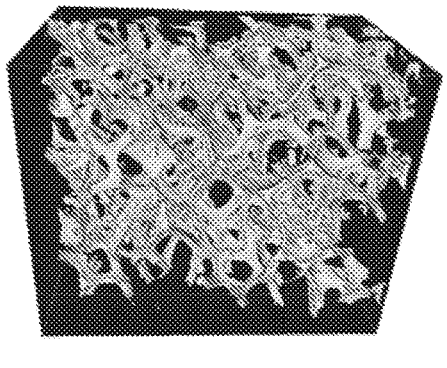
Figure 4G:
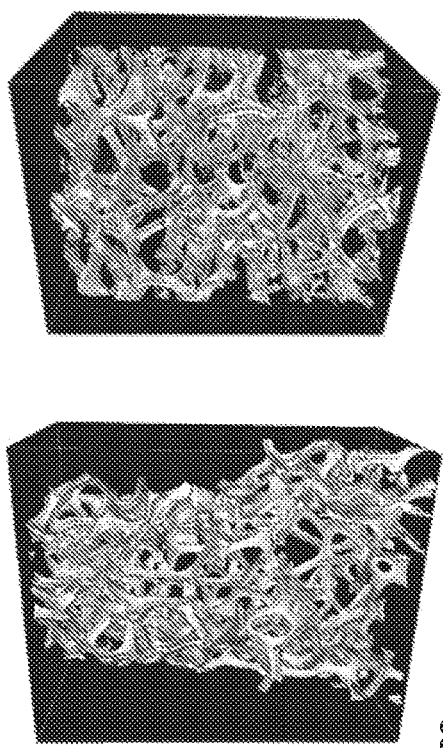
Figure 6A:
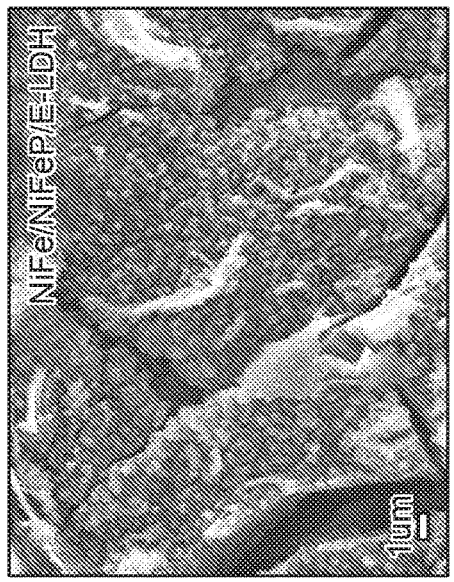
FIG. 6. a, X-ray diffraction pattern of NiFe/NiFeP/NiFe-LDH. b, SEM image of NiFe/NiFeP/NiFe-LDH. c, CV scans of NiFe/NiFeP/NiFe-LDH before and after about 85 h stability test in about 1 M KOH and about 1.5 M NaCl solution. d, Three-electrode water splitting stability test of NiFe/NiFeP/NiFe-LDH in about 1 M KOH and about 1.5 M NaCl electrolyte, at a substantially constant voltage of about 1.79 V vs. RHE, room temperature.
Figure 6B:
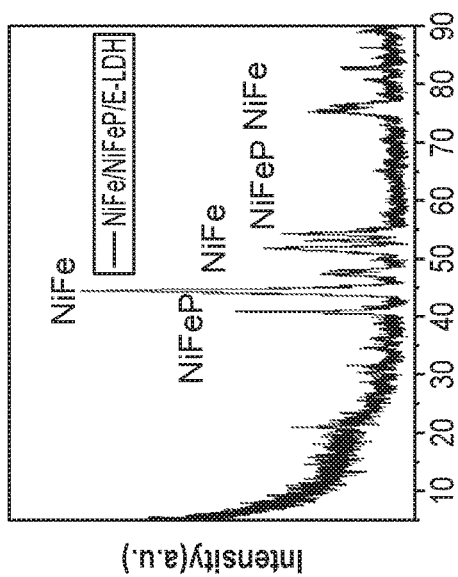
Figure 6C:
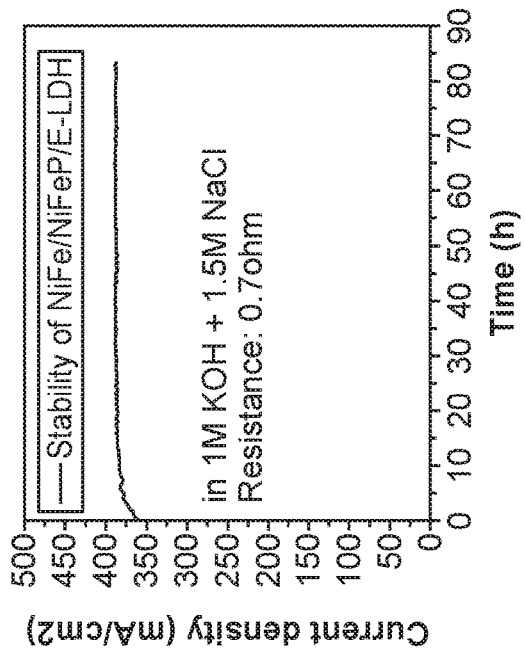
Figure 6D:
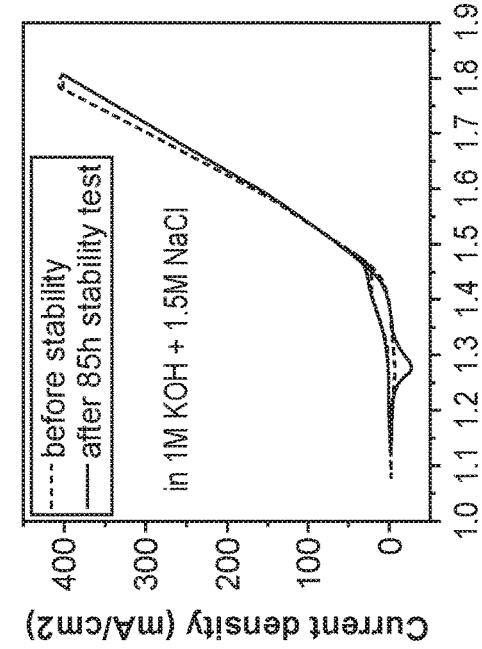
Figure 15:
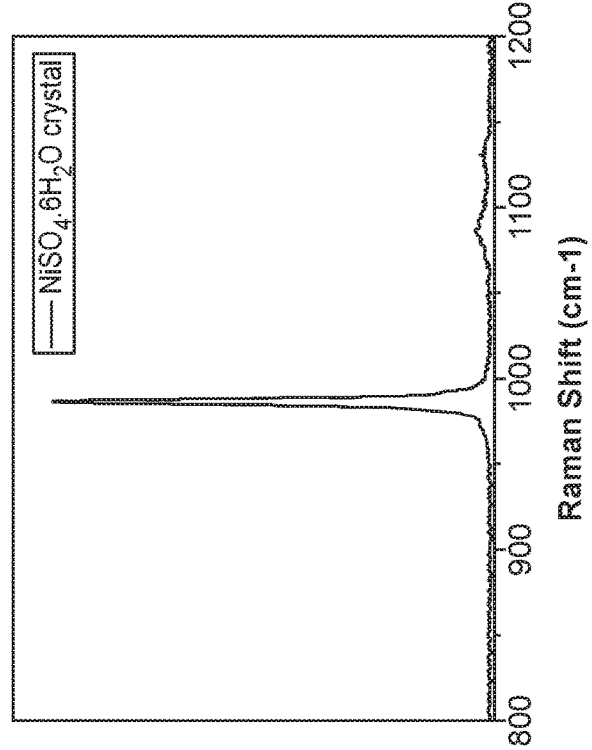
FIG. 15. Raman spectra of $NiSO_4 \cdot 6H_2O$ crystal.
Figure 16:
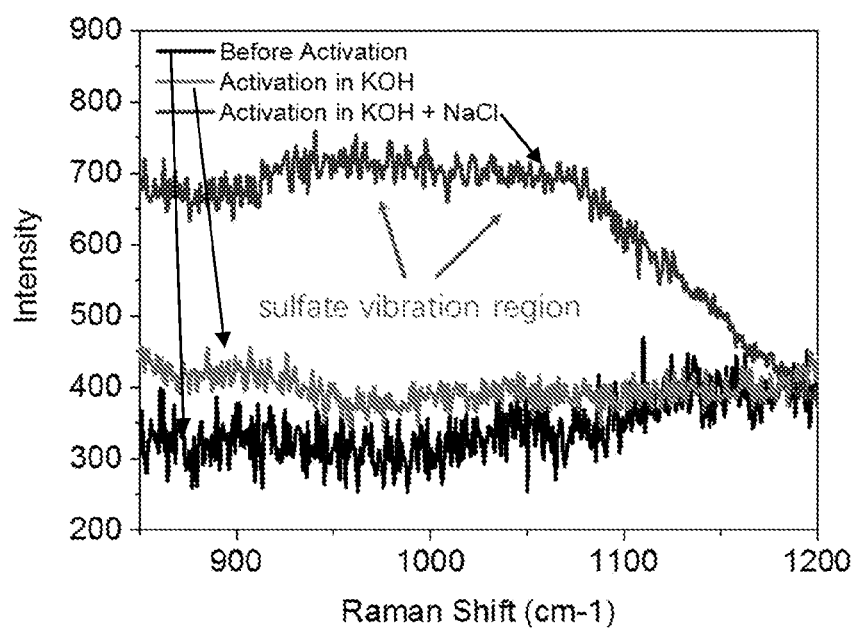
FIG. 16. Raman spectra of fresh Ni/$Ni_3S_2$/NiFe-LDH, after about 12 h activation in about 1 M KOH and about 12 h activation in about 1 M KOH+about 2 M NaCl.

Raman spectra of the electrode after about 1000 h stability test showed two noticeable peaks located at about 985 cm$^{-1}$ and about 1050 cm$^{-1}$ (FIG. 4e), matching spectral features of pure NiSO$_4$ (FIG. 15) and indicating a sulfate layer was formed on the Ni$_3$S$_2$ layer. In the activation phase of the first several hours of electrolysis, three-electrode data of the NiFe-LDH/Ni$_3$S$_2$/Ni foam anode at a substantially constant current of about 100 mA/cm$^2$ showed a dip in voltage at about 2 h of testing (FIG. 4f) and a corresponding decrease in the R_FE to about 97% for OER at the same time point (FIG. 4g). It is proposed that this decrease in voltage and R_FE was a result of transient corrosion/passivation process that resulted in the formation of a thin sulfate layer at the interface between the $Ni_3S_2$ and NiFe-LDH layers, as confirmed by the Raman spectra before and after activation process (FIG. 16). Sulfates and other multivalent anions such as phosphates and molybdates can adsorb on hydrous metal oxides and render them more cation-selective and effective at repelling chloride anions. The cation-selective interface plays a key role in corrosion inhibition by repelling chloride anions and not allowing them to reach, and corrode, the underlying metal.

Based on the control experiments and electrode characterization, it is concluded that the bi-layer structure of the anode leads to high performance and long-term stability. A highly active, uniform OER catalyst layer (NiFe-LDH) covering a support draws a majority of an oxidative current during seawater electrolysis, and acts as a major protective layer for the underlying material. In addition, a uniformly distributed, corrosion resistant passivation support layer ($Ni_3S_2$) on top of the Ni foam current collector dramatically prolongs the anode life. The presence of sulfate in the Raman and reduced change to the $Ni_3S_2$ layer observed in XANES mapping implies that an anionic layer forms at the interface between the NiFe-LDH and $Ni_3S_2$ layers that is capable of repelling chloride and halting corrosion of the underlying structures. Importantly, this understanding has led to developing another dual-layer anode comprised of an OER active NiFe-LDH coating on a NiP layer formed on a Ni foam with anionic phosphate groups at the NiFe-LDH-NiP interface, also achieving excellent seawater splitting without noticeable decay (see Appendix). Similarly, when stainless steel (SS) was used as a substrate with LDH coated on its surface, molybdate ions on the SS surface acted as another cation-selective passivation layer for highly stable seawater splitting (see Appendix).

Conclusion

A dual-layer NiFe-LDH/$Ni_3S_2$ anode is developed for active and stable seawater electrolysis. The uniformly electrodeposited NiFe-LDH was a highly selective OER catalyst for alkaline seawater splitting, while the $Ni_3S_2$ layer underneath afforded a conductive substrate and meanwhile generated a cation-selective sulfate layer to protect the electrode from chloride etching. The seawater electrolyzer can achieve a current density of about 400 mA/cm$^2$ under about 2.1 V in real sea water or salt accumulated seawater plus about 1 M KOH electrolyte at room temperature, while about 1.72 V was sufficient in industrial electrolysis condition (saturated NaCl plus about 6 M KOH electrolyte under about 80° C.). Besides, the electrolyzer showed dramatic durability. No noticeable activity loss was observed after about 1000 h stability test. Such a seawater splitting electrolyzer provides an opportunity to use vast seawater resources on earth as an energy source.

Appendix

Another dual-layer anode was prepared by electrodepositing OER active NiFe-LDH on a NiP layer formed on a Ni foam. After activation, an anionic phosphate layer formed at the NiFe-LDH-NiP interface, also acting as a passivation layer.

The structure of the as-prepared Ni/$Ni_2P$ foam is characterized by X-ray diffraction (XRD) and is shown in FIG. 5a. Besides the three strong diffraction peaks from the Ni foam, the main diffraction peaks at 2θ=about 40.7°, about 44.6°, about 47.3°, and about 54.2° correspond to the diffraction peaks of hexagonal $Ni_2P$ (JCPDF #01-089-2742). SEM images show $Ni_2P$ crystals of a size of about 200 nm are formed and uniformly cover the Ni substrate (FIG. 5b).

The OER performance of Ni/$Ni_2P$/NiFe-LDH was examined by cyclic voltammetry (CV) in a three-electrode electrochemical cell (FIG. 5c). The catalyst shows an onset potential of about 1.45 V (overpotential is about 220 mV) vs. RHE in an electrolyte of about 1 M KOH and about 1.5 M NaCl, which is similar to that on Ni/$Ni_3S_2$ substrate. The stability of the Ni/$Ni_2P$/NiFe-LDH was assessed in the same electrolyte at a substantially constant voltage of about 1.79 V vs. RHE (FIG. 5d). The catalyst shows a stable current density of about 380 mA/cm$^2$ in about 1 M KOH and about 1.5 M NaCl during the about 45 h testing period. To further verify the performance of this corrosive-resistant OER catalyst in an industrial setting, an electrolyzer was constructed by pairing this anode with a $Cr_2O_3$—Ni—NiO cathode and testing in an electrolyte composed of about 6 M KOH and about 1.5 M NaCl at about 80° C. (FIG. 5e). The results reveal that about 1.72V is sufficient to maintain a desirable current density of about 400 mA/cm$^2$. Even after about 550 h, the voltage to reach about 400 mA/cm$^2$ increased by just about 80 mV. Altogether, the results indicate that Ni/$Ni_2P$/NiFe-LDH is also a highly stable OER electrode that can tolerate a salty environment.

The phosphide coating followed by LDH deposition strategy was also applied to nickel iron alloy foam (NiFe foam). The as-prepared NiFe/(NiFe)$_2$P/NiFe-LDH electrode shows an onset potential of about 1.45 V vs. RHE, similar to the Ni/$Ni_2P$/NiFe-LDH electrode. And this electrode can also perform an active OER process in about 1 M KOH+about 1.5 M NaCl for more than about 85 h (FIG. 6).

Figure 7A:
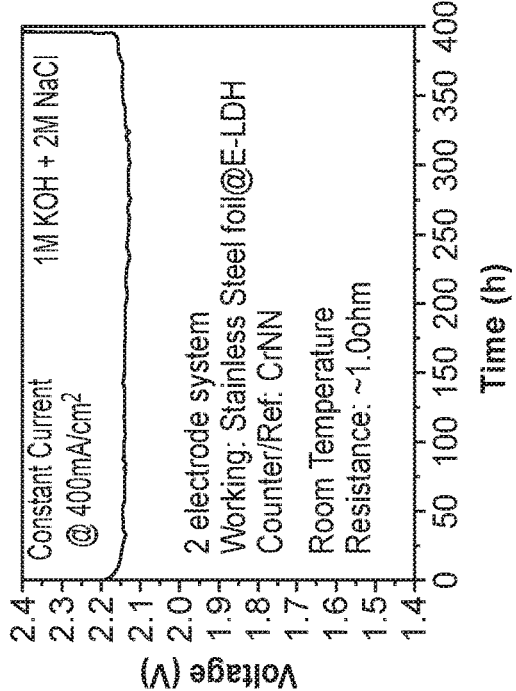
FIG. 7. a, CV scan of stainless steel (SS)/NiFe-LDH in about 1 M KOH and about 2 M NaCl solution, at a scan rate of about 5 mV/s. b, Stability test of an electrolyzer paired by SS/NiFe-LDH anode and a $Cr_2O_3$—Ni—NiO cathode in about 1 M KOH and about 2 M NaCl electrolyte, at a substantially constant current density of about 400 $mA/cm^2$. c, LSV scan of a two-electrode system with SS 316 foam with and without NiFe-LDH vs. $Cr_2O_3$—Ni—NiO in about 1 M KOH+about 2 M NaCl at a scan rate of about 5 mV/s. d, Substantially constant current test at about 400 $mA/cm^2$ of the two electrolyzers from (c).
Figure 7B:
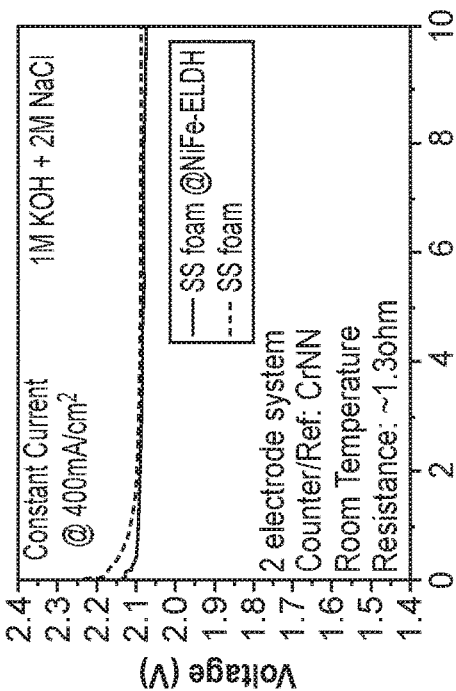

Similarly, stainless steel 316 is a synthetic anti-corrosion material with about 5% (atomic percentage) molybdenum doping, and, when an anodic current is applied, molybdenum at or near a surface is oxidized to molybdate ion, which is another cation-selective, anti-corrosion protection layer. Thus, following the bi-layer design, NiFe-LDH is electrodeposited directly on a stainless steel substrate. It is shown in FIG. 7a that the OER performance was quite similar to LDH on a Ni or NiFe foam substrate, indicating successful deposition of LDH on the substrate. Impressively, such an electrode also showed dramatically stable performance at a substantially constant current density of about 400 mA/cm$^2$ in about 1 M KOH+about 2 M NaCl electrolyte, which was about 4 times the salt concentration of seawater, indicating the bi-layer anti-corrosion mechanism worked in this case.

Figure 7C:
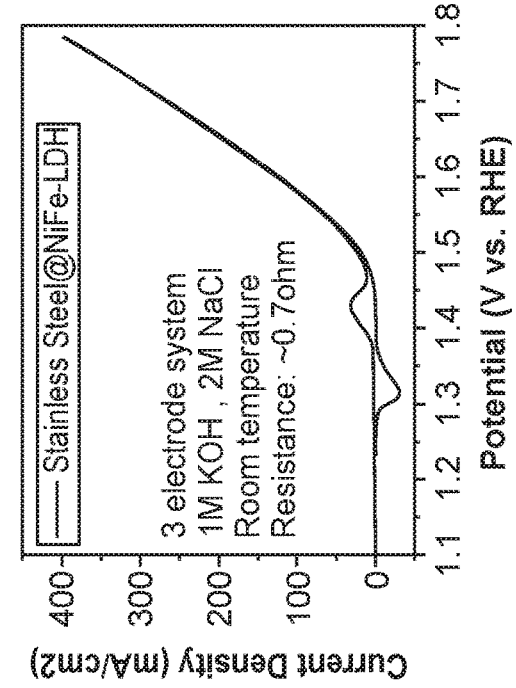
Figure 7D:
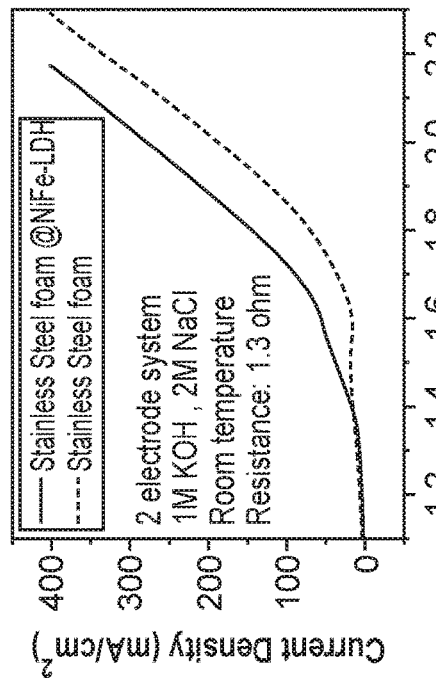
Figure 8A:
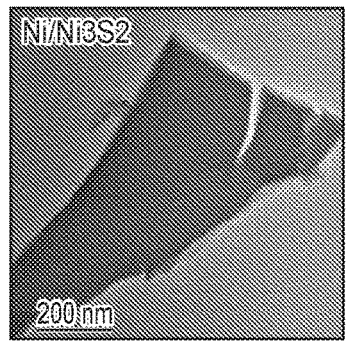
FIG. 8. a, b, c, d, e, f, Electron diffraction patterns of Ni/$Ni_3S_2$ and Ni/$Ni_3S_2$/NiFe-LDH.
Figure 8B:
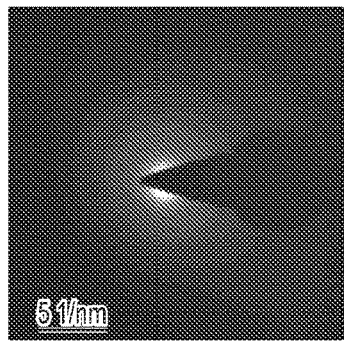
Figure 8C:
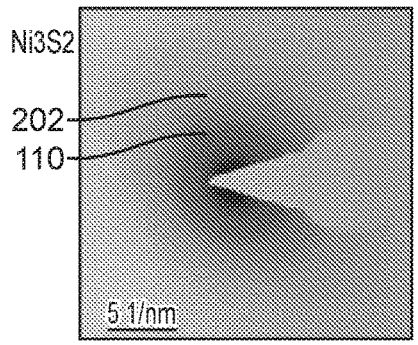
Figure 8D:
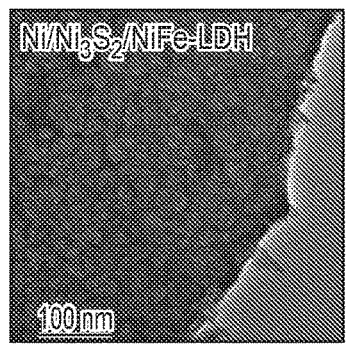
Figure 8E:
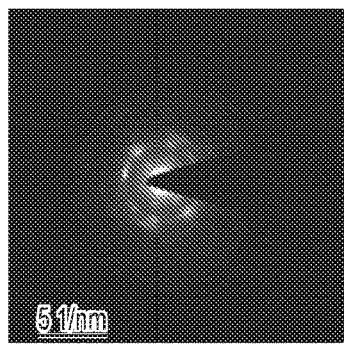
Figure 8F:
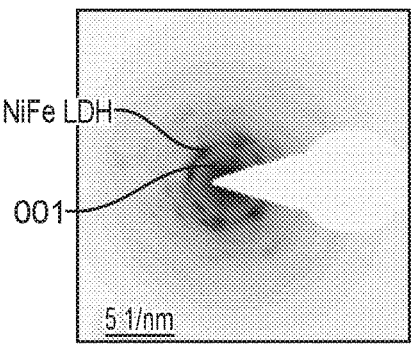

In addition to a SS 316 foil, a high surface area SS 316 foam was used to improve performance. The foam was tested with and without electrodeposited NiFe-LDH (FIGS. 7c and 7d). The NiFe-LDH-coated sample showed improved initial activity but after about 3-4 h, the bare SS foam activated and became within about 10 mV of the NiFe-LDH-coated sample. This implies that during electrolysis in KOH, a NiFe hydroxide material is generated on the SS foam surface and that the molybdate anions may form a cation-selective layer.

Methods

Fabrication of Ni foam/$Ni_3S_2$: Ni foam (about 420 g/m$^2$, degreased via sonication in acetone and ethanol) was firstly annealed in about 10% H$_2$ (by volume, about 90% Ar) atmosphere to substantially fully remove a surface natural oxidation layer. About 50 mg of sulfur powder (Sublimed, JT Baker) were dissolved in about 30 mL of anhydrous toluene (Sigma-Aldrich, about 99.9%) in a Teflon-lined stainless-steel autoclave. Then two pieces of the as-annealed Ni foam with a size of about 1 cm by about 3.5 cm were placed in the toluene solution. The autoclave was then heated to about 150° C. for about 5 h. After the autoclave was allowed to cool to room temperature, the product was washed 3 times with ethanol and toluene and dried at room temperature.

Electrodeposition of NiFe-LDH: Ni foam (about 420 g/m$^2$, degreased via sonication in acetone and ethanol) or Ni$_3$S$_2$—Ni foam or stainless steel foil/foam was placed in an about 150 mL solution of about 6 mM Ni(NO$_3$)$_2$ (Sigma-Aldrich, about 98%) with about 2 mM Fe(NO$_3$)$_3$ (Sigma-Aldrich, about 98%) as a working electrode with Pt mesh (counter) and Ag/AgCl satd. KCl (reference). The solution was kept at about 10° C. and stirred at about 100 rpm. The working electrode was held at about −1 V vs. Ag/AgCl satd. KCl (R=about 20Ω) for about 45 minutes and a hydroxide layer was formed. The electrode was rinsed with deionized water and then dried at room temperature.

Fabrication of Ni—NiO—Cr$_2$O$_3$ cathode: About 0.8 mL of about 0.2 M Ni(CH$_3$COO)$_2$ (Sigma-Aldrich, about 98%) and about 40 μL of about 0.5 M Cr(NO$_3$)$_3$ (Sigma-Aldrich, about 99.99%) were added to about 8 mL of anhydrous N,N-dimethylformamide (N,N-DMF, Acros, about 99.8%) in an about 20 mL scintillation vial and stirred vigorously at about 90° C. for about 4 h. After stirring, a product was collected and washed with ethanol (Fisher, Histological grade) 3 times via centrifugation. The product was re-dispersed in ethanol and sonicated with about 30 wt. % of about 20 nm Ni particles (US Research Nanomaterials, about 99.9%) for about 30 minutes. The dispersion was then loaded into a Ni foam (about 420 g/m$^2$, degreased via sonication in acetone and ethanol) at about 90° C. and then annealed in about 1.3-1.5 Torr of Ar for about 1 h at about 300° C. The weight difference between the bare foam and the foam after annealing was taken to be the catalyst loading. One unit of about 8 mL of N,N-DMF will produce an electrode with about 8 mg/cm$^2$ of Ni—NiO—Cr$_2$O$_3$+about 30 wt. % of about 20 nm Ni. For the evaluation, double loading (about 16 mg/cm$^2$ Ni—NiO—Cr$_2$O$_3$+about 30 wt. % of about 20 nm Ni) was used to improve performance at high current.

Synthesis of Colloidal NiFe-LDH for control samples: About 3.2 mL of about 0.5 M Ni(CH$_3$COO) (Sigma-Aldrich, about 98%) and about 0.64 mL of about 0.5 M Ni(NO$_3$)$_3$ (Sigma-Aldrich, about 98%) were added to about 80 mL of anhydrous N,N-dimethylformamide in a Teflon-lined stainless steel autoclave. The autoclave was then heated to about 120° C. for about 18 h followed by about 160° C. for about 2 h. After the autoclave was allowed to cool to room temperature, a product was washed 3 times with ethanol (Fisher, Histological grade) via centrifugation. The colloidal NiFe-LDH plates were then re-dispersed in ethanol (Fisher, Histological grade) and sonicated with about 30 wt. % of about 20 nm Ni particles for about 30 minutes and loaded into a Ni foam or Ni$_3$S$_2$—Ni foam. The loading used for this evaluation was about 20 mg/cm$^2$ of NiFe LDH+about 30 wt. % of about 20 nm Ni particles.

Synthesis of Ni/Ni$_2$P and NiFe/NiFeP: The Ni/Ni$_2$P and NiFe/NiFeP materials were synthesized by a chemical vapor deposition method. About 100 mg of red phosphorus was placed in a quartz tube with a piece of nickel foam or nickel iron foam downstream at about 5 cm away from the red phosphorus. Before the reaction starts, the quartz tube was operated with a flow of about 100 sccm of Ar gas for about 30 min. Then the quartz tube was heated to about 450° C. with a ramp of about 10° C./min. When the temperature reached about 450° C., the furnace was held at this temperature for about 60 min. After that, the furnace was cooled down naturally to room temperature with Ar flow.

Synthesis of Ni/Ni$_2$P/NiFe-LDH and NiFe/NiFeP/NiFe-LDH: A similar protocol of electrodeposition of NiFe-LDH as for forming Ni/Ni$_3$S$_2$/NiFe-LDH was used for preparation of NiFe-LDH on a surface of Ni/Ni$_2$P and NiFe/NiFeP, except a solution of about 3 mM Ni(NO$_3$)$_2$ (Sigma-Aldrich, about 98%) with about 1 mM Fe(NO$_3$)$_3$ (Sigma-Aldrich, about 98%) was used as an electrolyte. And the working electrode was Ni/Ni$_2$P or NiFe/NiFeP, with Pt mesh (counter) and Ag/AgCl satd. KCl (reference).

Electrochemical Characterization

The as-fabricated seawater splitting anodes were clamped by a Teflon-covered platinum electrode holder. In order to avoid salt accumulation on the electrolyte/electrode/air interface during electrolysis in salty electrolyte, the as-prepared electrodes were sealed by epoxy with about 1 cm by about 1 cm anode materials exposed to the electrolyte. Before seawater splitting and oxygen evolution reaction (OER) test, all anodes were activated in about 1 M KOH and about 1 M KOH+about 0.5 M NaCl electrolytes at a substantially constant anodic current density of about 100 mA/cm$^2$ for about 12 h each.

OER studies were carried out in a standard three-electrode system controlled by a CHI 760D electrochemistry workstation. The as-fabricated anodes were used as working electrodes, and Pt mesh and saturated calomel electrode (SCE) were used as the counter and reference electrode, respectively. The reference was calibrated against and converted to reversible hydrogen electrode (RHE). Linear sweep voltammetry was carried out at about 1 mV/s between about 1 V and about 1.8 V (vs. RHE) for the polarization curves. The anodes were cycled about 50 times by cyclic voltammetry (CV) until a stable CV curve was developed before measuring polarization curves. All polarization curves were not iR-compensated.

Seawater electrolysis was carried out on a LANHE battery tester working at constant charging mode with a substantially constant current density of about 400 mA/cm$^2$. The as-prepared Ni/Ni$_3$S$_2$/NiFe-LDH (or other anode samples prepared) was used as an anode and Ni—NiO—Cr$_2$O$_3$ was used as a cathode.

Gas Chromatography measurement: OER electrodes were operated in a gas-tight electrochemical cell with about 1 M KOH or about 1 M KOH+about 2 M NaCl electrolyte and SCE reference electrode. Chronopotentiometry was applied with different current density to maintain substantially constant oxygen generation. Meanwhile, Ar was constantly purged into the cell with a flow rate of about 25 cm$^3$/min and the cell was connected to the gas-sampling loop of a gas chromatograph (SRI 8610C). A thermal conductivity detector (TCD) was used to detect and quantify the oxygen generated.

Materials Characterization: The size and morphology of the samples were characterized using a field-emission scanning electron microscope (JEOL JSM6335) operating at about 20 kV. Raman spectroscopy was carried out using a Horiba Raman spectrometer equipped with an Olympus BX41 microscope and a Spectra-Physics 532 nm Ar laser.

X-ray spectroscopy: X-ray micro tomography was conducted using both synchrotron (beamline 2-2 of Stanford Synchrotron Radiation Lightsource (SSRL)) and laboratory (Stanford Nano Shared Facilities) based X-ray sources. High energy X-rays penetrate through the sample and are converted into visible photons by a scintillator crystal before the transmission images are recorded using a 2D area detector. Samples are rotated along a vertical axis with an angular step of about 0.5 degrees to facilitate the tomographic reconstruction. Micro tomographic scans generated data with 3D spatial resolution at about 1 micron, which is sufficient for resolving the morphology of the metal foams.

Two-dimensional nanoscale XANES mapping is carried out using a transmission X-ray microscope (TXM) installed at beamline 6-2C of SSRL. With the use of a Fresnel zone plate as an objective lens, the transmission images collected using this system are of nominal spatial resolution of about 30 nm. The energy of the incoming X-rays is scanned through the K-edge of Ni, providing spatially resolved spectroscopic finger prints over the scanned area. The energy step near the absorption edge is set to be about 1 eV for sufficient energy resolution, while it is set to be about 15 eV in the pre-edge and the post-edge region in order to cover a wide energy window for normalization of the spectra. The TXM XANES data reduction is carried out using a custom developed software package referred to as TXM-Wizard.

Example 2

Highly Sustained Anodes and Electrolytes for Salty Alkaline and Neutral Water Splitting Introduction Seawater accounts for roughly 97% of the world's water, but is difficult to use as an electrolysis feedstock without expensive desalination. Electrode corrosion by sodium chloride has impeded hydrogen production from seawater at an industrial scale. This example sets forth approaches to improve the performance of seawater electrolyzers, including improvements to major components: anodes, cathodes, and electrolytes.

This example sets forth a highly active and stable anode by anodizing a NiFe alloy-coated NiFe foam in a bicarbonate solution, at high temperature. The catalyst is an in situ grown carbonate-intercalated nickel iron hydroxide on a metallic substrate. The choice of the substrate can be, for example, nickel foam/mesh, nickel cobalt foam, stainless steel, nickel chromium foil/mesh, nickel cobalt ferrous alloy (e.g., available as Kovar) and other nickel-containing alloy. Furthermore, the high temperature anodization is extended to Ni mesh by adding a dipping process involving an iron-containing solution before the anodization. The resulting nickel iron hydroxide carbonate (NiFe—HC) catalyst based on NiFe foam substrate and Ni mesh-Fe dip-HC are both active and stable in salty alkaline electrolyte at both room temperature and about 80° C. More importantly, these anodes are compatible with an electrolyte containing multivalent anions. The tests of the HC catalysts in about 0.5-2 M $Na_2CO_3/K_2CO_3$ added salty alkaline electrolytes show extraordinary stability greater than 1500 h. The application of the NiFe—HC catalyst in neutral and salty neutral electrolyte (pH=about 7.4) is also attempted. First, the NiFe—HC electrode in $CO_2$ saturated about 0.5 M $KHCO_3$ (pH=about 7.4) solution exhibited OER activity superior to commercial OER catalysts $IrO_2$ and Ir/C. The NiFe—HC showed a potential of about 1.68 V and about 1.82 V to reach about 10 mA/cm$^2$ and about 250 mA/cm$^2$ respectively and a high stability>120 h without noticeable decay. This can be utilized in anodes in $CO_2$ electrolyzers to convert $CO_2$ to useful fuels. Second, the catalyst showed remarkable activity of about 1.68 V to reach about 10 mA/cm$^2$ without noticeable chlorine evolution in $CO_2$ saturated about 0.5 M $KHCO_3$+about 0.3 M NaCl, and >22 h stability. The suitability of the HC catalysts in salty neutral solution can afford wide application in biological systems specifying efficient OER anodes.

This example also sets forth a variety of improved electrolyte compositions that remarkably elongates the lifetime of anodes for seawater splitting. Example 1 sets forth a dual-layer electrode structure (NiFe layered double hydroxide catalyst layer uniformly deposited on a conductive $NiS_x$ passivation layer), which can provide high activity and stability for seawater electrolysis. In situ oxidation of a sulfide layer forms a chloride-repelling anionic sulfate layer that results in an electrode that can tolerate remarkably high chloride anion concentrations of about 2 M (about four times the concentration of seawater) while generating oxygen at about 400 mA/cm$^2$ for >600 h. In this example, the chloride-blocking interface mechanism is extended to other multivalent anions including, for example, carbonates ($CO_3^{2-}$), phosphates ($PO_4^{3-}$), and sulfates ($SO_4^{2-}$). The formation of such anionic layer is simplified by directly adding salts containing these anions into an alkaline electrolyte. This methodology is a universal approach that is effective for various anodes such as Ni foam-ELDH, Ni foam-load NiFe LDH, and NiFe foam besides NiFe—HC. For example, the lifetime of Ni foam-ELDH was extended to more than 1000 h in about 1 M KOH+about 2 M NaCl from an original 12 h by adding about 3 M $K_2CO_3$. The lifetime of NiFe foam was extended to more than 800 h in about 1 M KOH+about 2 M NaCl from an original 2 h by adding about 1 M $Na_2CO_3$. The stability of Ni foam-load NiFe LDH was greatly improved in about 6 M KOH+about 1 M NaCl at about 80° C. by adding about 0.5 M $K_2CO_3$, with stability>600 h without noticeable decay vs. gradual decay if without adding $K_2CO_3$. The simplified approach renders the industrial application of these catalysts more attractive due to a lowered cost and streamlined process for forming these catalysts.

Results and Discussion

Figure 17C:
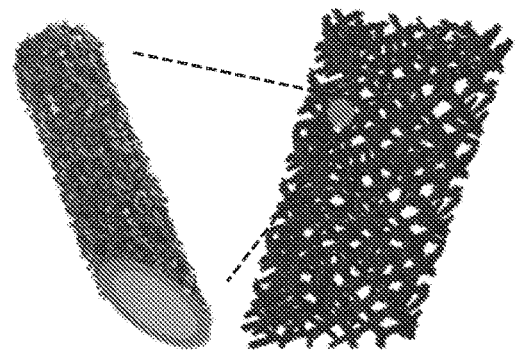
FIG. 17. a, Schematic of a starting NiFe foam. b, Voltage vs. time curve at substantially constant current density of about 250 $mA/cm^2$ during anodization of NiFe foam at about 85° C. Inset shows an experimental setup. c, Schematic of a resulting NiFe hydroxide carbonate (NiFe—HC) after anodization, where the metallic surface turns to a dark color with rough surfaces. d, Powder X-ray diffraction (XRD) of the anodized foam including NiFe—HC. The lines correspond to the XRD pattern of α-$Ni(OH)_2$ (JCPDS card No. 38-0715). e and f, SEM images of the foam after anodization at low and high magnifications, and energy-dispersive X-ray spectroscopy (EDX) mapping of the NiFe—HC showing the elemental distribution.
Figure 17A:
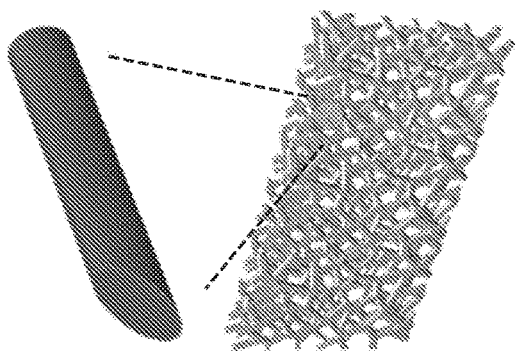
Figure 17B:
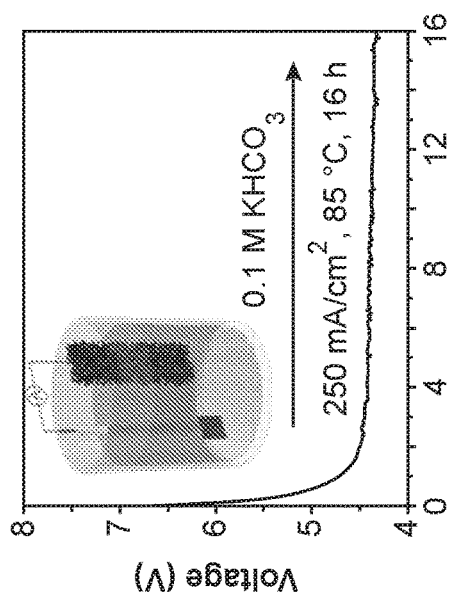
Figure 17F:
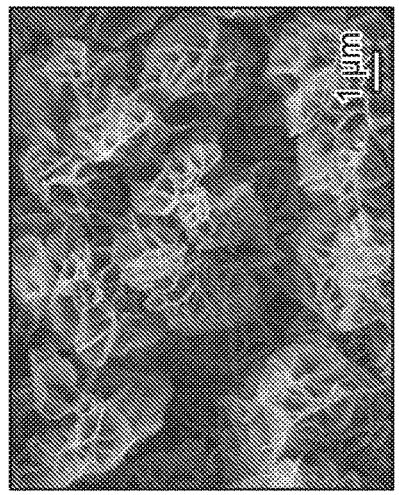
Figure 17E:
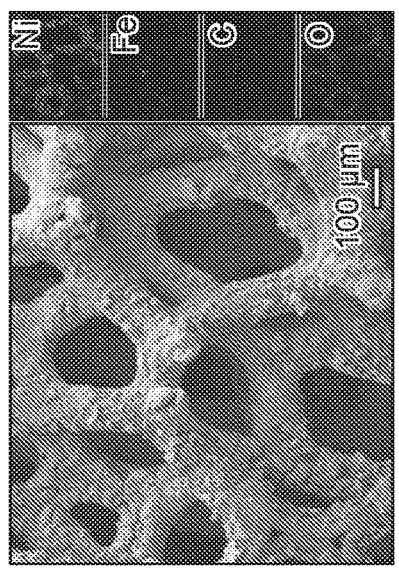
Figure 17D:
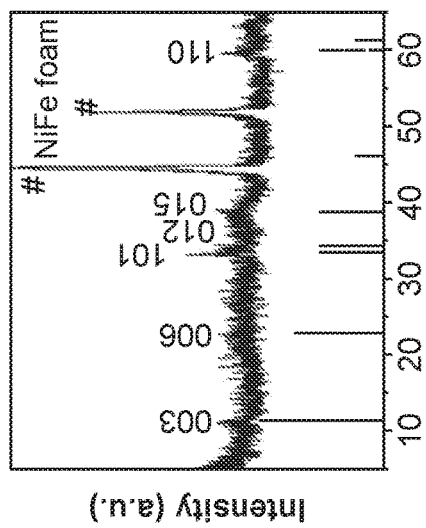

An improved anode is formed by growing carbonate-intercalated nickel iron hydroxides (NiFe—HC) on a metallic substrate, through anodization at high temperature (e.g., from room temperature to about 80° C. and above). The as-prepared NiFe—HC catalyst shows extraordinary OER activity and stability (>1500 h) towards seawater splitting. FIG. 17 shows a demonstration of the synthesis, structure and morphology characterization of this catalyst prepared on a commercial-type nickel iron foam. Briefly, a piece of commercial nickel iron foam was anodized against a platinum mesh in an about 0.1 M $KHCO_3$ solution maintained at about 85° C. at a substantially constant current of about 250 mA/cm$^2$ for about 16 h (see voltage vs. time curve in FIG. 17b), after which the original metallic NiFe foam turned into a dark foam. Etching of the foam was seen from the debris and color change in the electrolyte. The original smooth NiFe wires (about 100 μm wires) in the foam evolved into highly porous and rough structures substantially fully covered with about 2-3 μm sized flower shaped plates (FIG. 17e, f). Energy-dispersive X-ray spectroscopy (EDX) mapping (FIG. 17e) revealed an atomic ratio of Ni:Fe:C of about 15:1:3.4. X-ray diffraction (XRD) of the material showed broad and weak peaks indicating poorly crystalline structures in a discernable NiFe hydroxide carbonate phase (similar to α-phase nickel hydroxide (JCPDS-38-0715))

Figure 18C:
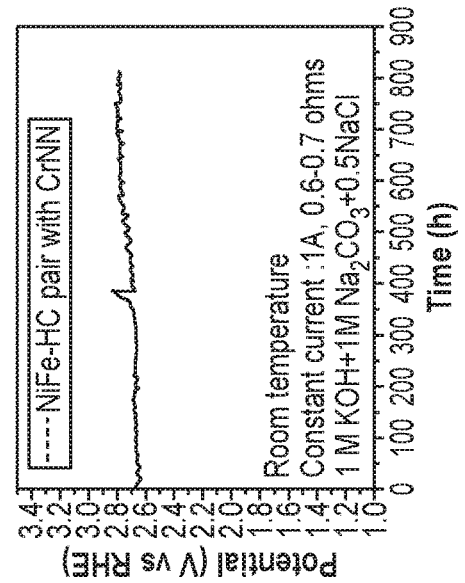
FIG. 18. a, CV scan of NiFe—HC in about 1 M KOH electrolyte at a scan rate about 5 mV/s. b, Stability test of an electrolyzer paired by NiFe—HC anode and a platinum mesh cathode in about 1 M KOH, about 1 M $Na_2CO_3$, and about 2 M NaCl electrolyte, at a substantially constant current density of about 400 mA/cm², at room temperature. c, Stability test of an electrolyzer paired by a NiFe—HC anode and a $Cr_2O_3$—Ni—NiO cathode in about 1 M KOH, about 1 M $Na_2CO_3$, and about 0.5 M NaCl electrolyte, at a substantially constant current density of about 1 A/cm², at room temperature. d, Stability test of an electrolyzer paired by a NiFe—HC anode and a nickel mesh cathode in about 6 M KOH, about 2 M $K_2CO_3$, and about 0.5 M NaCl electrolyte, at a substantially constant current density of about 400 mA/cm², at about 80° C. e, Stability test of an electrolyzer paired by a NiFe—HC anode and a $Cr_2O_3$—Ni—NiO cathode in about 6 M KOH, about 0.5 M $K_2CO_3$, and about 1 M NaCl electrolyte, at a substantially constant current density of about 400 mA/cm², at about 80° C. f, Stability test of an electrolyzer paired by a NiFe—HC anode and a platinum cathode in about 0.1 M KOH, about 3 M $K_2CO_3$, and about 1 M NaCl electrolyte, at a substantially constant current density of about 400 mA/cm², at room temperature.
Figure 18F:
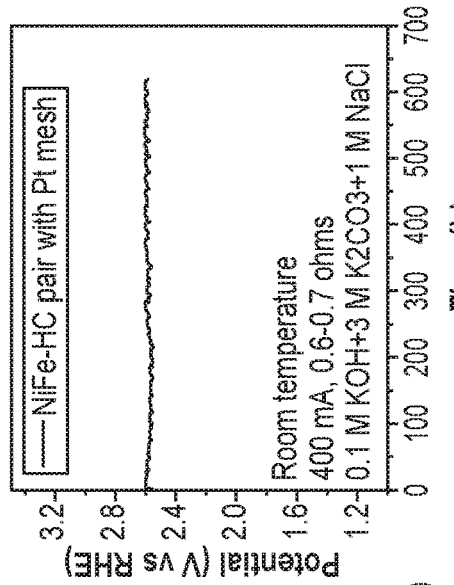
Figure 18B:
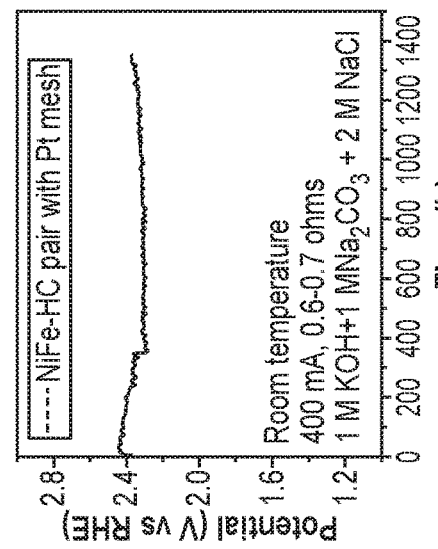
Figure 18E:
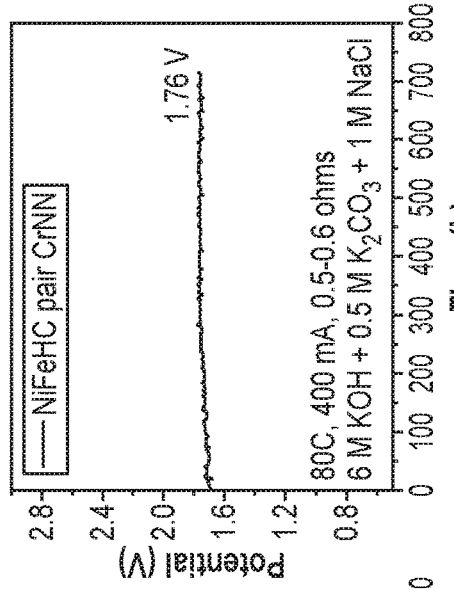
Figure 18A:
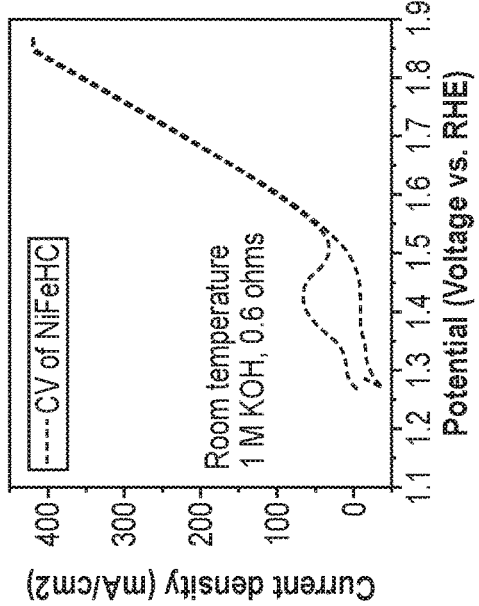
Figure 18D:
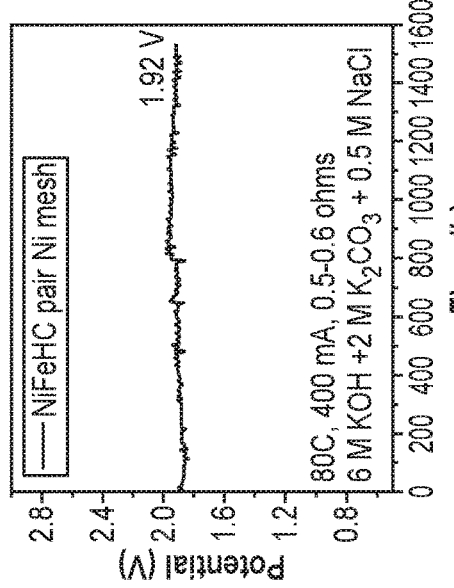

FIG. 18a shows the intrinsic OER activity of the NiFe—HC in about 1 M KOH measured by cyclic voltammetry (CV) scan. NiFe—HC specified about 1.83 V to reach about 400 mA/cm$^2$, similar to Ni foam-load NiFe LDH. FIG. 18b shown two-electrodes stability by pairing NiFe—HC as an anode with a Pt mesh as a cathode in about 1 M KOH+about 1 M Na$_2$CO$_3$+about 2 M NaCl electrolyte. More than 1200 h stability and a low cell voltage of about 2.35 V was achieved at room temperature. Further test of NiFe—HC under even harsher condition such as high current (about 1 A/cm$^2$) and lower pH (about 0.1 M KOH, pH of about 13) also showed good stabilities (FIGS. 18c and f). Minor decay in FIG. 18c was caused by a low water level that exposed a Cr$_2$O$_3$—Ni—NiO cathode to air and thus compromised its activity after 400 h. Besides, the NiFe—HC was tested in simulated industrial process conditions: about 80° C. and about 6 M KOH with about 0.5-2 M K$_2$CO$_3$ additive and about 0.5-1 M NaCl (FIGS. 18d and e). A cell voltage of about 1.92 V and >1500 h stability was achieved while pairing NiFe—HC with a commercial-type Ni mesh, in about 6 M KOH+about 2 M K$_2$CO$_3$+about 0.5 M NaCl electrolyte, at a substantially constant current density of about 400 mA/cm$^2$. The cell voltage was further improved to about 1.76 V with the high stability retained for >700 h, while using a more active Cr$_2$O$_3$—Ni—NiO cathode.

The high temperature anodization approach was also effectively applied to various metallic substrates to form active OER anodes, including nickel foam/mesh, nickel cobalt foam, stainless steel, nickel chromium foil/mesh, nickel cobalt ferrous alloy and other nickel-containing alloys. FIG. 19 shown anode performance of using Ni mesh as a metallic substrate, first dipped with an iron nitrate solution (about 0.05-0.5 M) for about 30 min to partially etch the nickel metal to cations by oxidation, while reducing the Fe$^{3+}$ to Fe$^{2+}$ and absorbed on the surface of the nickel metal substrates. The iron-containing nickel metal was further anodized at about 20 mA/cm$^2$ using about 0.1 M KHCO$_3$ as an electrolyte for about 16 h, in an about 85° C. oil bath. The as-prepared active material is referred as Ni mesh-Fe dip-HC. A similar approach was also applied to Ni foam and yielded Ni foam-Fe dip-HC. FIG. 19a shows the three-electrodes OER activity of Ni mesh-Fe dip-HC in about 1 M KOH characterized by linear sweep voltammetry (LSV). The anode specified just about 1.76 V to reach about 400 mA/cm$^2$. The stability was also evaluated in the same three-electrodes configuration at constant voltage mode and room temperature (FIG. 19b). Ni mesh-Fe dip-HC showed superior stability without noticeable decay. The good activity and stability was also demonstrated at high temperature (about 80° C.) and high alkaline concentration (about 6 M KOH) with about 0.5 M K$_2$CO$_3$ additive and about 1 M NaCl (FIG. 19c). A low cell voltage of about 2.1 V was shown by pairing with a nickel mesh cathode. This is close to the performance of an electrolyzer including a Ni foam/load NiFe LDH anode and a similar Ni mesh cathode.

In addition to the OER evaluations in alkaline electrolyte, the NiFe—HC catalyst was evaluated in neutral electrolyte with and without added NaCl. CO$_2$ saturated neutral bicarbonate electrolyte can be used for CO$_2$ utilization/reduction to useful fuels to close the carbon cycle. OER dictates an overall efficiency of CO$_2$ electrolyzers. However, the OER in a neutral electrolyte of other approaches rely heavily on noble metal catalysts such as Ir and IrO$_2$. Here it is found NiFe—HC can be utilized in CO$_2$ saturated KHCO$_3$ solution (pH=about 7.4) to catalyze OER efficiently. FIGS. 20a and b show LSV curves and stability test of NiFe—HC catalyzed OER in CO$_2$ saturated KHCO$_3$ solution, respectively. NiFe—HC shows lower overpotential than OER catalysts Ir and IrO$_2$ and superior stability at even about 250 mA/cm$^2$. Besides, the neutral electrolyte is specified in many biological processes, and often has NaCl in its components. Stable OER is useful to pair with biological reduction process, for example, to convert CO$_2$ to fuels using bacteria. Due to the sluggish kinetics of the OER reaction in neutral condition, the specified overpotential to reach the same activity is much higher than in alkaline condition, and chlorine evolution can be readily triggered at about 1.71 V vs. RHE. Various metallic catalysts could be corroded quickly at such demanding conditions, rendering OER at neutral condition with salts very challenging. Here the NiFe—HC catalyst was tested in about 0.5 M KHCO$_3$ and about 0.3 M NaCl (FIGS. 20c and d). The catalyst specified about 1.68 V to reach about 10 mA/cm$^2$. This was below the standard potential for chlorine evolution, and the system was stable for more than 20 h.

A NiCr—HC based anode is also formed by using a modified approach from that used to form NiFe—HC. A piece of Ni mesh/Ni foam is paired against a Pt mesh or another piece of Ni mesh/foam, and anodized in a mixture of about 0.1 M KHCO$_3$ and about 0.00025-0.00075 M Cr(NO$_3$)$_3$. The anodization is done at about 20 mA/cm$^2$ for about 16 h, at about 80° C. in an oil bath. In addition, NiCr—HC can also be formed by dipping a piece of Ni foam/Ni mesh in about 0.5 M K$_2$Cr$_2$O$_7$ solution for about 3 h, then removing and drying on a hotplate for about 30 min, and after that, the electrode was anodized against another piece of Ni mesh/foam in about 0.1 M KHCO$_3$, where the anodization condition is about 20 mA/cm$^2$ for about 16 h, at about 80° C. in an oil bath.

Another NiCr—HC based anode is formed by pairing a piece of Nichrome foil (commercial, about 20% Cr) against a Pt mesh and anodized in about 0.1 M KHCO$_3$, where the anodization condition is about 20 mA/cm$^2$ for about 16 h, at about 80° C. in an oil bath.

A NiCo—HC based anode is also formed by using a modified approach from that used to form NiFe—HC. A piece of NiCo foam is paired against a Pt mesh and anodized in about 0.1 M KHCO$_3$, where the anodization condition is about 20 mA/cm$^2$ for about 16 h, at about 80° C. in an oil bath.

A Ni—HC based anode is also formed by using a modified approach from that used to form NiFe—HC. A piece of Ni foam/Ni mesh is paired against a Pt mesh and anodized in about 0.1 M KHCO$_3$, where the anodization condition is about 20 mA/cm$^2$ for about 16 h, or about 50 mA/cm$^2$ for about 8 h, all at about 80° C. in an oil bath.

A stainless steel-HC based anode is also formed by using a modified approach from that used to form NiFe—HC. A piece of stainless steel is paired against a Pt mesh and anodized in about 0.1 M KHCO$_3$, where the anodization condition is about 20 mA/cm$^2$ for about 16 h, at about 80° C. in an oil bath.

An iron nickel cobalt alloy-HC based anode is also formed by using a modified approach from that used to form NiFe—HC. A piece of commercial iron nickel cobalt alloy foil (available as Kovar) is paired against a Pt mesh and anodized in about 0.1 M KHCO$_3$, where the anodization condition is about 20 mA/cm$^2$ for about 16 h, at about 80° C. in an oil bath.

A variety of cathodes can be paired with the above anodes in an electrolyzer. These include nickel foam, nickel mesh, and $Cr_2O_3$—Ni—NiO (or nanoscale Ni—NiO heterostructures that are blended with a corrosion-resistant $Cr_2O_3$ layer (also referred to as Cr—Ni—NiO or CrNN)) and coated onto a porous Ni foam substrate. These cathodes can show high hydrogen evolution activity and stability in an electrolyte with mixed KOH and salts.

Figure 21A:
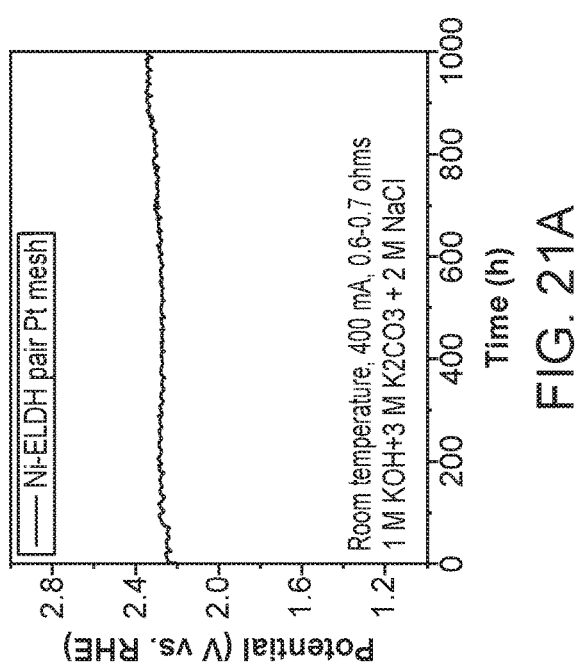
FIG. 21. a, Stability test of an electrolyzer paired by Ni foam-ELDH anode and a platinum mesh cathode in about 1 M KOH, about 3M $K_2CO_3$, and about 2 M NaCl electrolyte, at a substantially constant current density of about 400 mA/cm². b, LSV scan of Ni foam-ELDH after about 1000 h water splitting test in about 1 M KOH, about 3 M $K_2CO_3$, and about 2 M NaCl electrolyte at a scan rate of about 5 mV/s. c, Digital images of the electrolyte and Ni foam-ELDH after stability test described in (a). d, Stability test of an electrolyzer paired by Ni foam-ELDH anode and a platinum mesh cathode in about 1 M KOH, about 1 M $K_2CO_3$, about 0.1 M $K_3PO_4$ and about 2 M NaCl electrolyte, at a substantially constant current density of about 400 mA/cm².
Figure 21B:
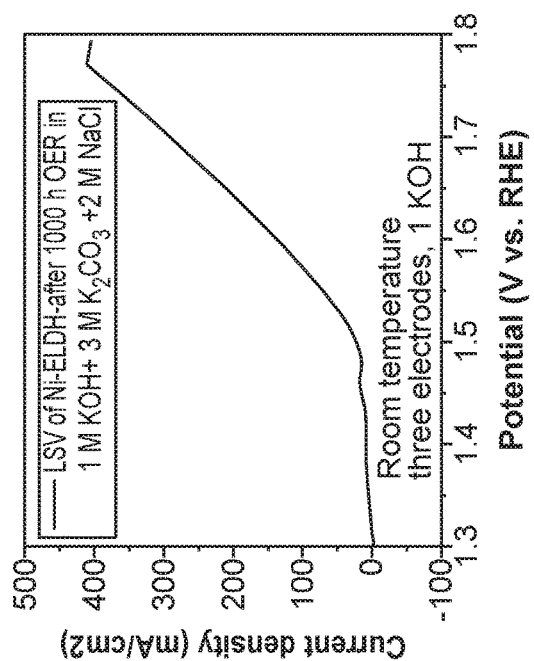
Figure 21C:
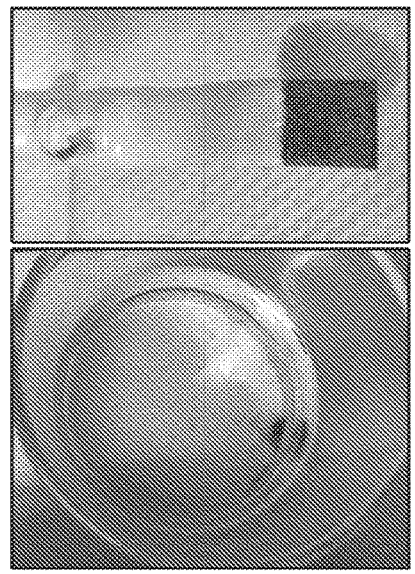
Figure 21D:
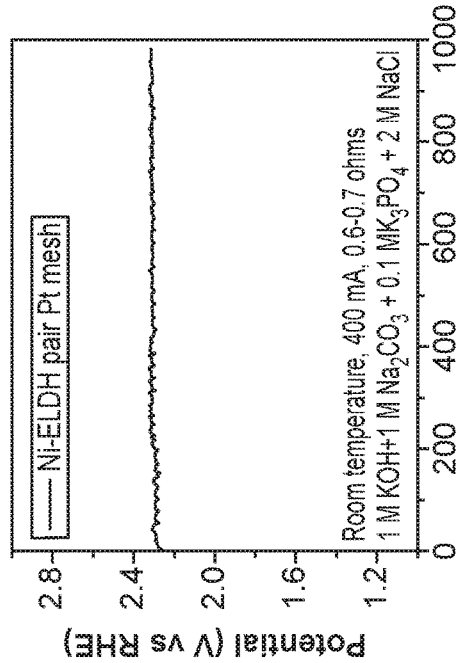

To directly observe the effects of high valence state anions such as $CO_3^{2-}$, $PO_4^{3-}$, and $SO_4^{2-}$ on the stability of anodes for salty water splitting, these anions were intentionally added to salty alkaline electrolytes. FIG. 21a shows the addition of $K_2CO_3$ to about 1 M KOH and about 2 M NaCl greatly improves the stability of Ni-ELDH from 12 h to more than 1000 h. The OER activity was confirmed after the 1000 h stability test by LSV scan as shown in FIG. 21b, with about 1.76 V to reach about 400 mA/cm². FIG. 21c shows the electrolyte and the Ni-ELDH electrode after the 1000 h durability test at a substantially constant current density of about 400 mA/cm², respectively. Both the clear electrolyte and integral electrode reveal no or little etching or corrosion occurring in the carbonate added salty alkaline electrolyte. FIG. 21d shows the addition of a mixture of salts containing both carbonates (about 1 M $Na_2CO_3$) and phosphates (about 0.1 M $K_3PO_4$) into about 1 M KOH and about 2 M NaCl also substantially improves the durability of the Ni-ELDH anodes, with more than 1000 h stability achieved.

Figure 22B:
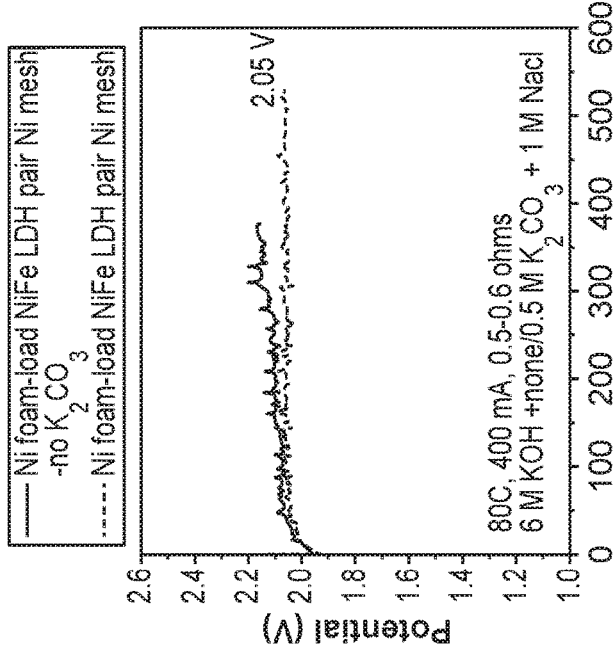
FIG. 22. a, LSV scan of Ni foam/load NiFe-LDH in about 1 M KOH electrolyte. b, Stability test of an electrolyzer paired by a Ni foam/load NiFe-LDH anode and a nickel mesh cathode in about 6 M KOH and about 1 M NaCl electrolyte, at a substantially constant current density of about 400 mA/cm², at about 80° C. with about 0.5 M $K_2CO_3$ vs. without adding $K_2CO_3$. c, Stability test of an electrolyzer paired by a Ni foam/load NiFe-LDH anode and a $Cr_2O_3$—Ni—NiO cathode in about 6 M KOH, about 0.5 M $K_2CO_3$, and about 1 M NaCl electrolyte, at a substantially constant current density of about 400 mA/cm², at about 80° C.
Figure 22C:
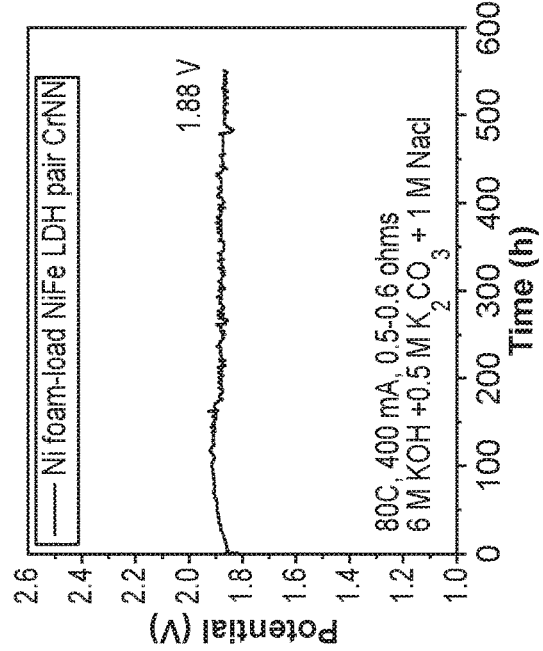
Figure 22A:
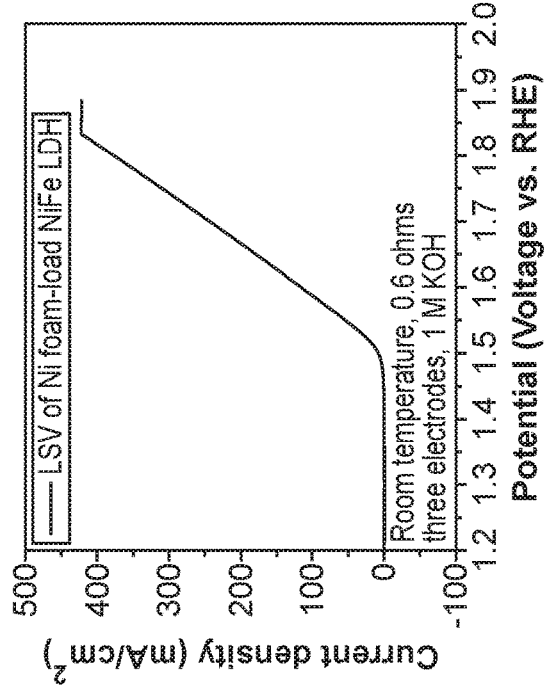

To further demonstrate the stabilizing effects of carbonate anions and its suitability for industrial applications, Ni foam-load NiFe LDH was tested in an electrolyzer operated at simulated industrial water splitting conditions: about 80° C. and a high concentration of KOH electrolyte. FIG. 22a shows the LSV scan of Ni foam-load NiFe LDH in about 1 M KOH and room temperature, and the activity was comparable to Ni-ELDH, with about 1.81 V to reach about 400 mA/cm², without iR compensation. FIGS. 22b and c show the excellent stability of Ni foam-load NiFe LDH paired with Ni mesh and $Cr_2O_3$—Ni—NiO, respectively in about 6 M KOH+about 0.5 M $K_2CO_3$+about 1 M NaCl, at about 80° C. Furthermore, the significant role of adding $K_2CO_3$ in the electrolyte was also shown in FIG. 22b, in which a control experiment pairing Ni foam-load NiFe LDH with Ni mesh was operated in about 6 M KOH+about 1 M NaCl at about 80° C. and without $K_2CO_3$ showed slow decay of performance, as revealed by the increasing potential over time at a substantially constant current of about 400 mA/cm².

Figure 23B:
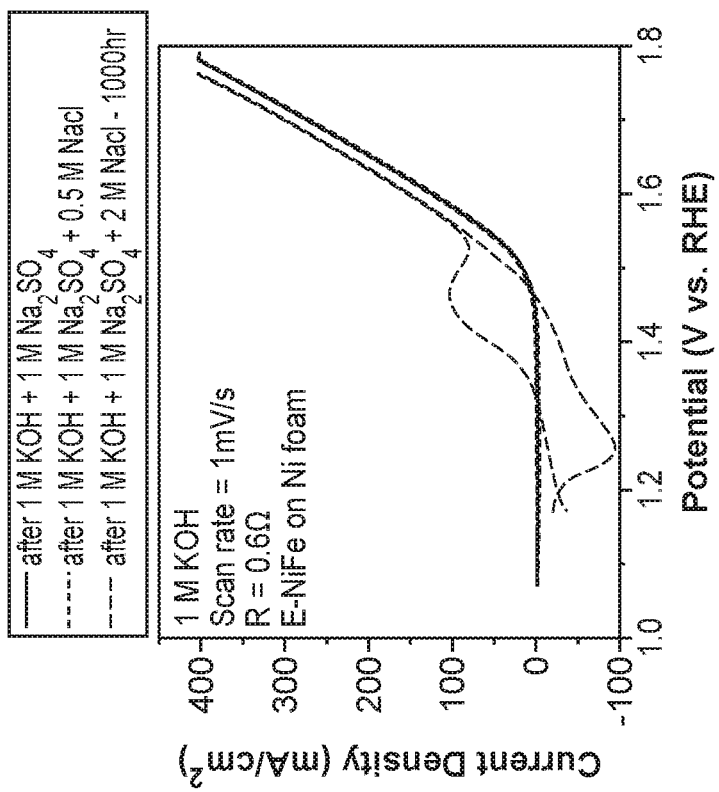
FIG. 23. a, Stability test of an electrolyzer paired by a Ni foam-ELDH anode and a platinum mesh cathode in about 1 M KOH, about 1 M $Na_2SO_4$ and about 2 M NaCl electrolyte, at a substantially constant current density of about 400 mA/cm². b, LSV scan of Ni foam-ELDH in about 1 M KOH after about 12 h constant current (about 400 mA/cm²) test in about 1 M KOH and about 1 M $Na_2SO_4$ electrolyte, after another 12 h constant current test (about 400 mA/cm²) in about 1 M KOH, about 1 M $Na_2SO_4$, and about 0.5 M NaCl electrolyte, and after 1000 h constant current (about 400 mA/cm²) in about 1 M KOH, about 1 M $Na_2SO_4$, and about 2 M NaCl electrolyte. All tests were performed at room temperature.
Figure 23A:
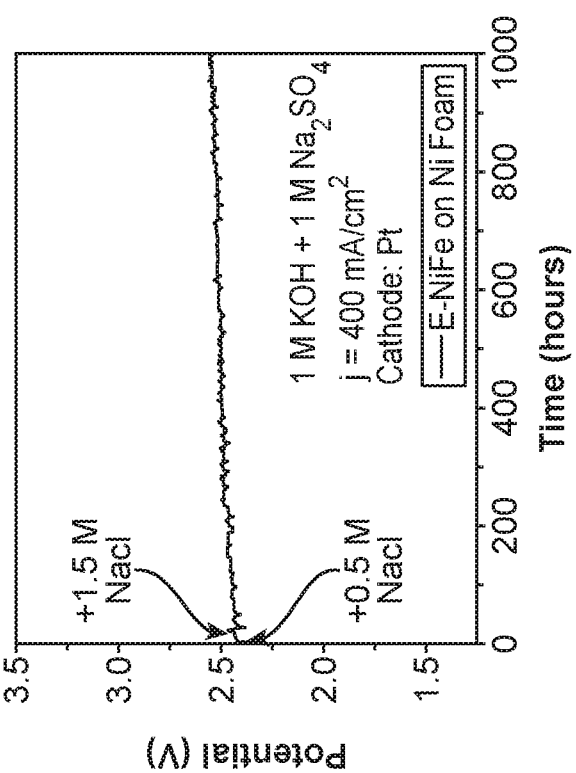

The effect of adding $SO_4^{2-}$ on seawater splitting stability was also tested. FIG. 23a shown the stability test of Ni foam-ELDH anode by pairing with a platinum mesh cathode. The test was conducted at a substantially constant current of about 400 mA/cm² in about 1 M KOH, about 1 M $Na_2SO_4$ and about 2 M NaCl electrolyte. The Ni foam-ELDH lasted more than 1000 h in such hash conditions. And the three-electrodes LSV curve of the anode showed no noticeable decay before and after the 1000 h test, which is demonstrated in FIG. 23b. The test with $SO_4^{2-}$ further demonstrates the stabilizing effects of adding cations on seawater splitting anodes.

Figure 24B:
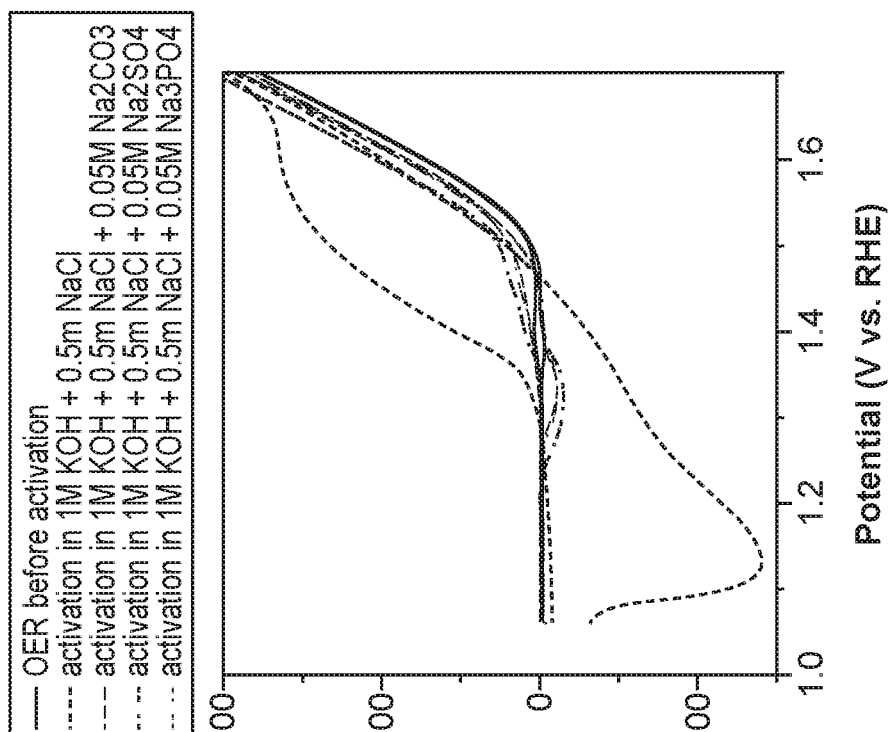
FIG. 24. a, CV scan. b, Enlarged CV scan in Ni oxidation region of Ni foam-ELDH before activation and after activation in about 1 M KOH+about 0.5 M NaCl and in about 1 M KOH+about 0.5 M NaCl+about 0.05 M sodium sulfate/phosphate/carbonate for about 24 h.
Figure 24A:
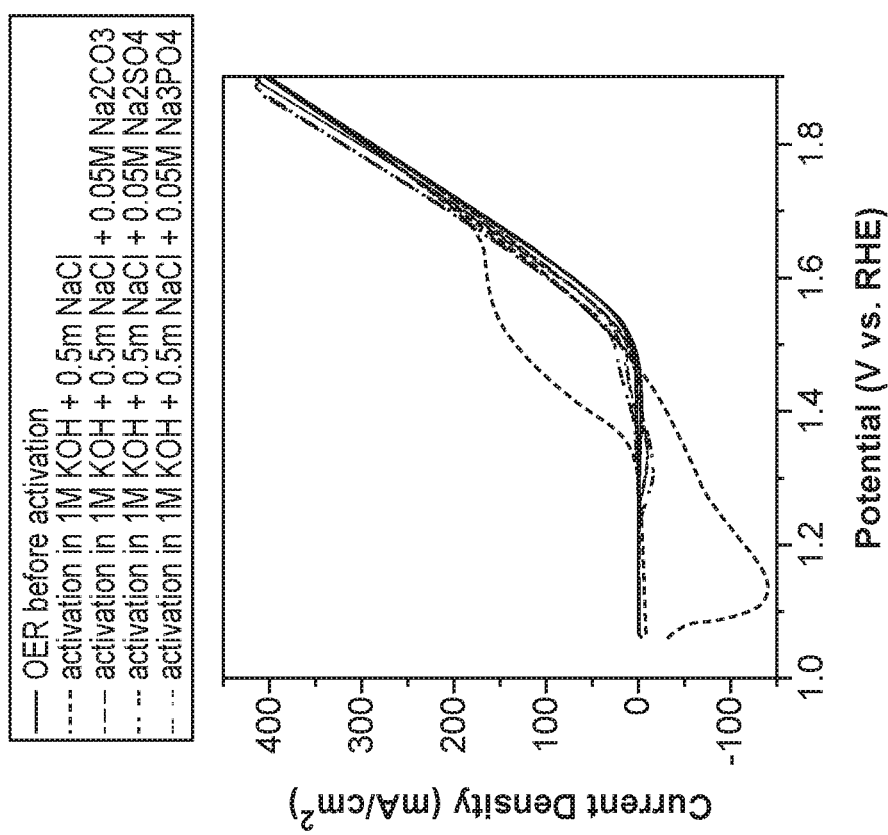

FIG. 24 shows activation of Ni foam-ELDH in about 1 M KOH and about 1 M KOH+about 0.5 M NaCl+about 0.05M $Na_2CO_3$, $Na_2SO_4$ or $Na_3PO_4$. Etching occurred in the electrolyte without $Na_2CO_3$, $Na_2SO_4$ or $Na_3PO_4$, indicating that these anions can prevent chloride etching.

Methods

Synthesis of NiFe—HC. A piece of nickel iron foam (about 4 cm×1 cm, thickness: about 1 mm, number of pores per inch: about 110 ppi, atomic ratio of Ni/Fe=about 1:3) was cleaned by sonicating the foam in acetone and ethanol for about 15 min in each solvent and dried, followed by annealing in about 9% $H_2$ (diluted by Ar, flow rate of Ar:$H_2$=about 200 sccm:about 20 sccm) at about 500° C. to remove the native oxides on the metal surface. The foam was glued in the middle by epoxy (Loctite EA 1C), which leaves an active area of about 1 cm×1 cm on one end, and an area of about 0.5-1 cm×1 cm on the other end that was clamped by an electrode holder. The foam was used as an anode, a platinum mesh (d=about 2 cm, 52 mesh) used as a counter electrode, and the two electrodes were placed at a distance of about 5 mm. About 0.1 M $KHCO_3$ solution was used as an electrolyte, and the electrodes were assembled in a two-electrodes Teflon electrochemical cell, and the whole cell was placed into an about 85° C. oil bath. The electrodes were connected to a LANHE battery tester and operated at a substantially constant current of about 250 mA for about 16 h as an optimized condition for NiFe—HC.

Synthesis of Ni mesh-Fe dip-HC. First, a Ni mesh is cleaned in acetone for about 20 min by sonication. This is followed by removing the native nickel oxide layer by sonicating in about 1-3% HCl for about 5 min. Then the surface is cleaned by sonicating in water for about 5 min, and dried on an about 100° C. hotplate for about 30 min. After this, the cleaned Ni mesh is dipped in about 0.5 M $Fe(NO_3)_3$ for about 30 min, and then removed, air dried on an about 100° C. hotplate, and where the color of the nickel mesh changes from metallic to dark gray. Lastly, a similar HC activation method is used by pairing the nickel mesh dipped with iron with a Pt mesh, operated at a substantially constant current of about 20 mA/cm² for about 16 h, in an about 85° C. oil bath. After completion, the color of the mesh turns dark, and the mesh is washed with water and dried in air.

Synthesis of Ni foam-ELDH. Ni foam (about 420 g/m², degreased via sonication in acetone and ethanol) was placed in an about 150 mL solution of about 6 mM $Ni(NO_3)_2$ (Sigma-Aldrich, about 98%) with about 2 mM $Fe(NO_3)_3$ (Sigma-Aldrich, about 98%) as a working electrode with Pt mesh (counter) and Ag/AgCl satd. KCl (reference). The solution was kept at about 10° C. and stirred at about 100 rpm. The working electrode was held at about −1 V vs. Ag/AgCl satd. KCl (R=about 20Ω) for about 45 min, and a hydroxide layer was formed. The electrode was rinsed with deionized water and then dried at room temperature.

Characterization. The powder X-ray diffraction (XRD) was carried out at room temperature using a Rigaku Ultima IV diffractometer (Cu Kα radiation, λ=1.5406 Å) at the beam voltage of about 40 kV and a current of about 44 mA, and a scan rate of about 1 degree/min. Scanning electron microscopy (SEM) was performed using a thermal field emission electron microscope operating at about 5 kV and equipped with an energy spectrum analyzer (model JSM-7100F).

Electrochemical measurement. Electrochemical measurements were performed at ambient conditions in a standard three-electrode configuration, using a CHI 760 electrochemical working station. The as-prepared electrodes were clamped by a Teflon-wrapped platinum electrode holder and used as a working electrode, Pt mesh (round shape, d=about 2 cm) was used as a counter electrode, and saturated calomel electrode (SCE) was used as a reference electrode and calibrated before each use. The electrolyte is a mixture solution of about 0.1-6 M KOH with about 0-3 M $K_2CO_3$ or $Na_2CO_3$ or $K_3PO_4$, and about 0-2 M NaCl. In the neutral electrolyte evaluation, $CO_2$ saturated about 0.5 M $KHCO_3$+ about 0.3 M NaCl (pH=about 7.4) was used as the electrolyte. Cyclic voltammetry (CV) was taken at a scan rate of about 5 mV/s. Two-electrodes seawater electrolysis was carried out on a LANHE battery tester working at constant charging mode with a substantially constant current density of about 400-1000 mA/cm$^2$. The as-prepared NiFe—HC or Ni mesh-Fe dip-HC (or other anode samples prepared) was used as an anode and Pt mesh or Ni—NiO—Cr$_2$O$_3$ was used as a cathode. No iR compensation was performed unless otherwise noted. A typical resistance for the tested systems was between about 0.5-1 ohm.

As used herein, the singular terms "a," "an," and "the" may include plural referents unless the context clearly dictates otherwise. Thus, for example, reference to an object may include multiple objects unless the context clearly dictates otherwise.

As used herein, the terms "connect," "connected," "connecting," and "connection" refer to an operational coupling or linking. Connected objects can be directly coupled to one another or can be indirectly coupled to one another, such as through another set of objects.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. An anode for oxygen evolution in water including chloride, comprising:
   a substrate;
   a passivation layer coating the substrate;
   an anionic layer comprising an anionic oxide of sulfur; and
   an electrocatalyst layer coating, wherein the anionic layer is disposed at an interface between the passivation layer coating and the electrocatalyst layer coating.

2. The anode of claim 1, wherein the electrocatalyst comprises a metal hydroxide, a mixed metal hydroxide, a metal-layered double hydroxide, a mixed metal-layered double hydroxide, a metal oxide or a mixed metal oxide.

3. The anode of claim 1, wherein the passivation layer comprising a nickel sulfide or nickel-iron sulfide.

4. The anode of claim 1, wherein the substrate is a metallic foam, foil or mesh.

5. The anode of claim 1, wherein the substrate comprises nickel.

6. A water electrolyzer comprising the anode of claim 1.

7. A method of operating the water electrolyzer of claim 6, comprising generating oxygen and hydrogen from water including sodium chloride.

8. The method of claim 7, wherein the water is alkaline seawater.

9. A method of operating a water electrolyzer containing the anode of claim 1, comprising generating oxygen and hydrogen from an electrolyte, wherein the electrolyte includes alkaline adjusted seawater and polyatomic anions dispersed in the alkaline adjusted seawater with precipitated alkaline earth and heavy metal ions removed by filtration and a concentration of the polyatomic anions in the electrolyte in a range of 0.05 M to 8 M.

10. The method of claim 9, wherein the polyatomic anions include $CO_3^{2-}$, $HCO_3^-$, $SO_4^{2-}$, $SO_3^{2-}$, $PO_4^{2-}$, $H_2PO_4^{2-}$, $HPO_4^{2-}$, or a combination of two or more thereof.

11. The method of claim 9, wherein the concentration of the polyatomic anions is from 0.05 M to 2 M.

12. A method of manufacturing the anode for oxygen evolution according to claim 1, comprising:
    providing a substrate;
    forming the passivation layer coating on the substrate;
    forming the electrocatalyst layer coating on the passivation layer coating; and
    applying a current to the substrate to form the anionic layer disposed at the interface between the passivation layer coating and the electrocatalyst layer coating.

13. The method of claim 11, wherein the forming the anionic layer further comprising applying the current to the substrate in the presence of an electrolyte comprising sulfate.

* * * * *